United States Patent
Montenegro et al.

(10) Patent No.: US 11,769,126 B1
(45) Date of Patent: Sep. 26, 2023

(54) SYSTEMS AND METHODS FOR ACCOUNT-LINKED PIGGY BANK

(71) Applicant: WELLS FARGO BANK, N.A., San Francisco, CA (US)

(72) Inventors: Dennis Montenegro, Concord, CA (US); Darren M. Goetz, Salinas, CA (US); John A. Kobuchi, San Francisco, CA (US); JoAnn Mar, San Francisco, CA (US); Jake Teitelbaum, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 45 days.

(21) Appl. No.: 17/114,295

(22) Filed: Dec. 7, 2020

(51) Int. Cl.
| G06Q 20/10 | (2012.01) |
| G06Q 40/02 | (2023.01) |
| G07C 9/00 | (2020.01) |
| A45C 1/12 | (2006.01) |
| G10L 15/22 | (2006.01) |
| G06F 3/0488 | (2022.01) |

(52) U.S. Cl.
CPC ............ *G06Q 20/108* (2013.01); *A45C 1/12* (2013.01); *G06Q 40/02* (2013.01); *G07C 9/00563* (2013.01); *G10L 15/22* (2013.01); *G06F 3/0488* (2013.01); *G10L 2015/223* (2013.01)

(58) Field of Classification Search
None
See application file for complete search history.

(56) References Cited

U.S. PATENT DOCUMENTS

| 8,628,371 B2 | 1/2014 | D'Alleva et al. | |
| 8,732,076 B2 | 5/2014 | Scipioni et al. | |
| 10,117,484 B1 | 11/2018 | O'Kane et al. | |
| 10,270,587 B1* | 4/2019 | Wu | H04L 9/0825 |
| 2008/0233829 A1 | 9/2008 | Sayles | |
| 2011/0003525 A1 | 1/2011 | Weatherley | |
| 2013/0048714 A1* | 2/2013 | Sharma | G06Q 20/346 235/379 |
| 2013/0340065 A1 | 12/2013 | Dyer | |
| 2017/0055655 A1* | 3/2017 | Meyers | G06Q 20/108 |

(Continued)

FOREIGN PATENT DOCUMENTS

| GB | 2351828 A * | 1/2001 | ............... A45C 1/12 |
| WO | WO-2014/202970 | 12/2014 | |

*Primary Examiner* — Namrata Boveja
*Assistant Examiner* — Divesh Patel
(74) *Attorney, Agent, or Firm* — Foley & Lardner LLP

(57) ABSTRACT

Systems and methods for an account-linked piggy bank are described. The system includes a piggy bank comprising a compartment, a lid, a sensor, a lock, a network interface, and a processing circuit. The processing circuit is configured to associate the piggy bank with a first account of a user. The processing circuit is further configured to receive, decoded coin data from an encodable physical coin, wherein the decoded coin data includes a transaction request indicating a currency amount to be transferred to the first account from a second account. The processing circuit is configured to transmit the transaction request to a provider computing system. The processing circuit is further configured to receive a transaction request confirmation from the provider computing system and transmit a notification to a user device of the user indicating the currency amount has been deposited into the first account of the user.

12 Claims, 7 Drawing Sheets

(56) References Cited

U.S. PATENT DOCUMENTS

| | | |
|---|---|---|
| 2017/0061397 A1 | 3/2017 | Lee |
| 2018/0197238 A1 | 7/2018 | Bergin et al. |
| 2019/0172366 A1 | 6/2019 | Birt et al. |
| 2020/0090148 A1 | 3/2020 | Lawrence et al. |

\* cited by examiner

SYSTEMS AND METHODS FOR ACCOUNT-LINKED PIGGY BANK

TECHNICAL FIELD

The present disclosure relates generally to the use of a piggy bank to promote financial education. More particularly, the present disclosure relates to systems and methods of currency and physical item transfers using the piggy bank and an animatronic animal.

BACKGROUND

Various toys and gadgets can be used to store coins and paper money. For example, many children have piggy banks. While traditional piggy banks can be helpful for storing physical currency, traditional piggy banks have limited functionality and have become less useful as currency systems become more digital.

SUMMARY

One embodiment relates to a piggy bank system comprising a piggy bank. The piggy bank comprises a compartment, a lid, a sensor, a network interface, and a processing circuit. The compartment is configured to receive contents. The lid is coupled to the compartment and configured to contain the contents within the compartment when closed. The lid is further configured to allow access to the compartment. The sensor is configured to sense when an encodable physical coin is added to or removed from the compartment. The sensor is further configured to decode and encode the encodable physical coins. The network interface is configured to facilitate data communication with a provider computing system and a user device via a network. The processing circuit comprises a processor and a memory. The processing circuit is configured to associate the piggy bank with a first account associated with a user. The processing circuit is further configured to receive, from the sensor, decoded coin data from an encodable physical coin added to the compartment. The decoded coin data includes a transaction request indicating a currency amount to be transferred to the first account from a second account. The processing circuit is further configured to transmit the transaction request to the provider computing system. The processing circuit is further configured to receive a transaction request confirmation from the provider computing system. The processing circuit is further configured to transmit a notification to a user device of the user indicating the currency amount has been deposited into the first account associated with the user.

Another embodiment relates to a method. The method comprises associating, by a processing circuit of a piggy bank system, a piggy bank with a first account of a user. The method further comprises receiving, by the processing circuit, decoded coin data from an encodable physical coin added to the piggy bank. The decoded coin data including a transaction request indicating a currency amount to be transferred to the first account from a second account. The method further comprises transmitting, by the processing circuit, the transaction request to a provider computing system. The method further comprises receiving, by the processing circuit, a transaction request confirmation from the provider computing system. The method further comprises transmitting, by the processing circuit, a notification to a user device of the user indicating the currency amount has been deposited into the first account of the user.

Another embodiment relates to a system comprising a lock box and a piggy bank. The piggy bank comprises a network interface and a processing circuit. The network interface is configured to facilitate data communication with a user device via a network. The processing circuit comprises a processor and a memory. The processing circuit is configured to receive, from an input device of the lock box, a first user input from a first user, wherein the first user input sets an authentication factor required for opening the lock box. The processing circuit is further configured to prompt a second user to provide the authentication factor. The processing circuit is further configured to receive, from the input device, a second user input from a second user, the second user input comprising the authentication factor. The processing circuit is further configured to compare the authentication factor inputted by the second user with the authentication factor inputted by the first user to determine that the second user is authorized to access the lock box. The processing circuit is further configured to unlock the lock box based on the second user being authorized to access the lock box. The processing circuit is further configured to transmit, to a user device associated with the first user, a notification indicating that the lock box has been unlocked.

This summary is illustrative only and is not intended to be in any way limiting. Other aspects, inventive features, and advantages of the devices or processes described herein will become apparent in the detailed description set forth herein, taken in conjunction with the accompanying Figures, wherein like reference numerals refer to like elements.

DETAILED DESCRIPTION

Referring generally to the figures, systems and methods for securely transferring currency and physical possessions, and financial planning using a user device, piggy bank, animatronic animal, and a lock box are shown and described. The systems and methods described herein increase accessibility to financial education for users and provide a secure method for monetary and physical transfers.

The piggy bank system utilizes encodable physical coins to complete currency transfers between a first financial account associated with a first user and a second financial account associated with a second user. The use of the encodable physical coin can allow a user (e.g. such as a child or teenager) to better understand electronic payments, and reduce the possibility of a user losing or having the currency stolen.

A lock box can contain physical items that can be transferred from one user to another where the first user locks the lock box and sets a required form of authentication. The lock box can be given to a second user who is prompted to provide the authentication as specified by the first user to unlock the lock box. The use of a lock box that can be transferred between users allows for a secure transfer of physical items from one user to another. The requirement of authentication by the receiving user further enhances the security of the physical item transfer.

The piggy bank system can utilize one or many artificial intelligence models to converse with the user. In some embodiments the piggy bank system can converse with the user verbally or using sign language. The piggy bank system can further provide additional auditory cues to assist the visually impaired. By storing personal user information and using it later in conversation with the user, the piggy bank system can be seen as more reliable and trustworthy. By building this relationship with the user, the piggy bank system can encourage the user to set goals (e.g., financial goals) and learn about financial health and how these can apply or be relevant to the user. Further, by using a speaker artificial intelligence (AI) model that can analyze the voice of the speaker, the piggy bank system can determine if someone other than the user is interacting with the piggy bank system and withhold personal user information.

Figure 1A:
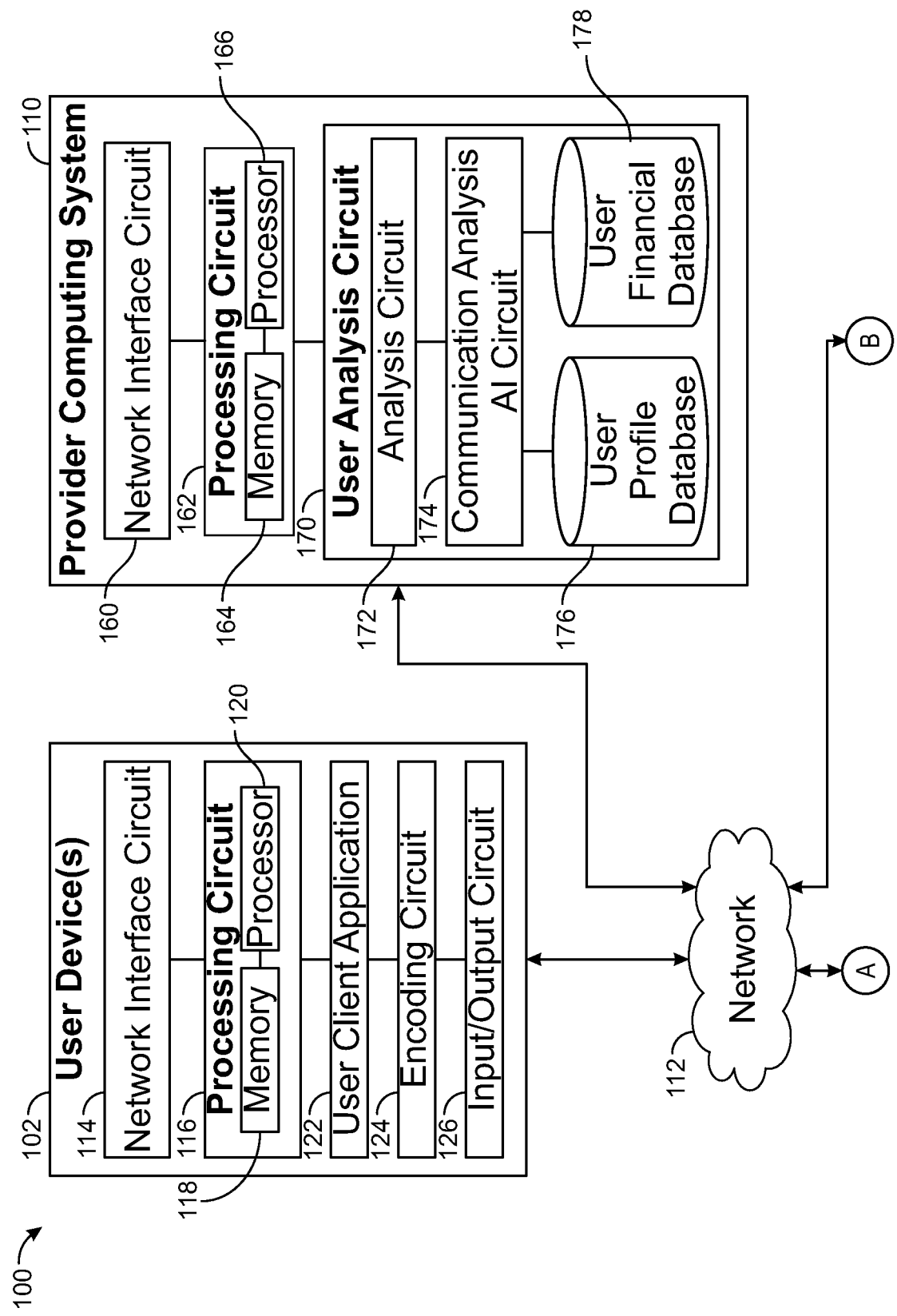
FIG. 1A and FIG. 1B are diagrams of a piggy bank system, according to an example embodiment.
Figure 1B:
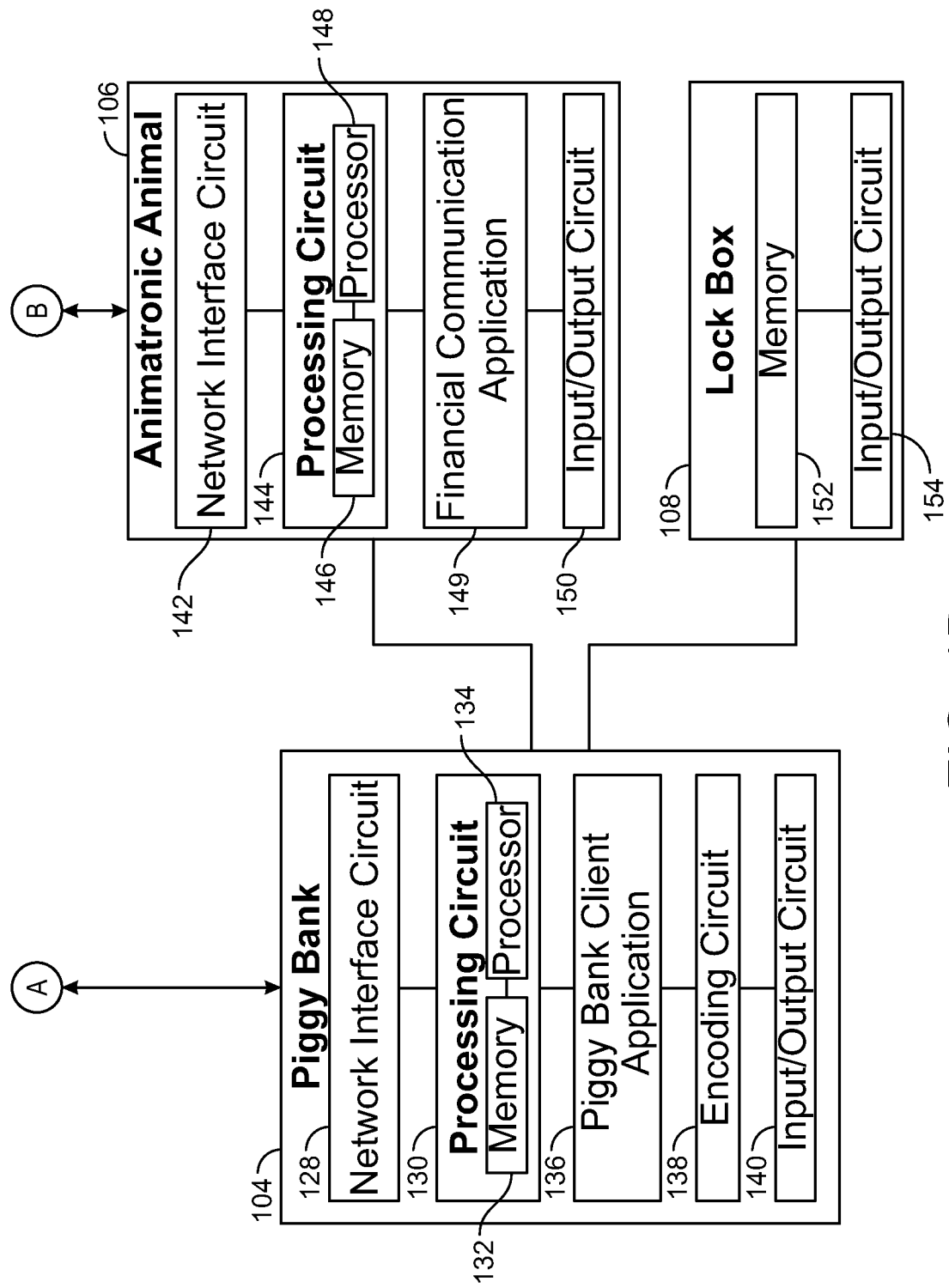

Referring now to FIGS. 1A and 1B, a block diagram of a piggy bank system 100, is shown. The piggy bank system 100 can be used to provide financial education. The piggy bank system 100 can be used to help a user (e.g., a child or teenager) with financial planning (e.g., saving up allowance to buy a new toy or to save for a new car). Additionally, the piggy bank system 100 can be used to perform currency transfers, and secure physical possession transfers.

The system 100 includes a user device 102, a piggy bank 104, an animatronic animal 106, a lock box 108, and a provider computing system 110. The user device 102, piggy bank 104, the animatronic animal 106, and provider computing system 110 are all in communication with each other and connected by a network 112. The user device 102 may be any suitable user computing device. For example, the user device 102 may be a mobile phone, a personal computer (e.g., a desktop computer or a laptop computer), a tablet, a wearable device (e.g., a smart watch), an augmented reality interface (e.g., smart glasses), or any other suitable user computing device capable of accessing and communicating using local and/or global networks. In some embodiments, the augmented reality interface is a modified reality headset configured to generate an overlay of augmented reality data provided by the provider computing system 110, or the animatronic animal 106 to be overlaid over a video or image of the user's surroundings. In these embodiments, the user device 102 may be a virtual reality headset that displays a virtual reality view of, for example, a provider location or bank branch to guide the user through the building and meet branch employees. While the piggy bank 104 and the animatronic animal 106 are shown in the figures and described herein as being separate systems with separate but similar components (e.g., network interface circuit, 128, 142, processing circuit 130, 144, input/output circuit 140, 150), in some embodiments the piggy bank 104 and the animatronic animal 106 can be a single system that does not include these components in duplicate.

The user device 102 includes a network interface circuit 114, a processing circuit 116, a user client application 122, an encoding circuit 124, and an input/output circuit 126. The network interface circuit 114 is used to establish connections with other computing systems by way of the network 112. For example, the network interface circuit 114 can be used to establish connections with the piggy bank 104, animatronic animal 106, and the provider computing system 110. The network interface circuit 114 includes program logic that facilitates connection of the user device 102 to the network 112. For example, the network interface circuit 114 may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface circuit 114 includes the hardware and machine-readable media sufficient to support communication over multiple channels of data communication. Further, in some arrangements, the network interface circuit 114 includes cryptography capabilities to establish a secure or relatively secure communication session in which data communicated over the session is encrypted.

To provide the functions of the user device 102, the network interface circuit 114 provides a relatively high-speed link to the network 112, which may be any combination of a local area network (LAN), an intranet (e.g., a private banking or retailer network), the Internet, or any other suitable communications network, either directly or through another external interface.

The processing circuit 116 is made up of a memory 118, and a processor 120. The memory 118 includes one or more memory devices (e.g., RAM, NVRAM, ROM, Flash Memory, hard disk storage) that store data and/or computer code for facilitating the various processes described herein. That is, in operation and use, the memory 118 stores at least portions of instructions and data for execution by the processor 120 to control the functionality of the processing circuit 116. Moreover, the memory 118 may be or include tangible, non-transient volatile memory or non-volatile memory. The processor 120 may be implemented as a general-purpose processor, an application specific integrated circuit (ASIC), one or more field programmable gate arrays (FPGAs), a digital signal processor (DSP), a group of processing components, or other suitable electronic processing components. As such, the user device 102 is configured to run a variety of application programs and store associated data in a database of the memory 118. One such application may be the user client application 122.

The user client application 122 is structured to provide displays to the user device 102 that enable the user to manage interactions with the various elements of the piggy bank system 100. The user client application 122 is communicably coupled via the network circuit over the network to the provider computing system 110. In one embodiment and as shown, the user client application 122 is a mobile banking application. In other embodiments, the user client application 122 may take different forms commensurate with the provider institution (e.g., mobile wallet application, etc.). The user client application 122 is structured to facilitate and permit conductance of transactions and management of accounts held by the user (e.g., at the provider institution associated with the provider institution computing system and/or other financial institutions). The user client application 122 may be able to provide the user with the ability to locate automated teller machines (ATMs), transfer money between accounts, view balances of accounts, provision payment accounts for mobile wallet functionality, perform transactions using a provisioned payment account (e.g., via a mobile wallet), etc. The user client application 122 is structured to track transactions made by the user either by using a physical payment card (e.g., debit card, credit card), or by mobile wallet (e.g., via a coupling to a mobile wallet application or the mobile application being configured as including a mobile wallet functionality). In some embodiments and as alluded to above, the user client application 122 includes or is otherwise associated with a mobile wallet implemented on the user device. For example, the user client application 122 may include a mobile wallet circuit therein that facilitates communications via the user device to a mobile wallet computing system (e.g., the provider computing system) enabling access to a user mobile wallet. In such embodiments, the user client application 122 is structured to permit mobile wallet users to engage in transactions through the initiation of communications with, for example, a merchant point of sale (POS) device. For example, in some embodiments, the user client application 122 includes a payment application facilitating exchange of mobile wallet credentials (e.g., tokenized account information) with the POS device. In this regard, the user client application 122 may interface with a near field communications (NFC) chip controller to exchange the mobile wallet credentials.

The user client application 122 can be structured such that a user client application 122 on a first user device 102 (supervisor) can have supervisory abilities over the user client application 122 on a second user device 102 (user). This capability can be assigned in the original set up of the piggy bank system 100. In some embodiments, the ability to supervise and override a user can be given to a user who is shown to be the parent and/or co-signer of a second user based on the banking account associated with the user client application 122. For example, a parent can use a first user device 102 to supervise a child utilizing the user client application 122 on a second user device 102. In some embodiments a supervisor (e.g., parent) can monitor the activity of the user (e.g., child, teenager) using the user client application 122, piggy bank 104, and/or animatronic animal 106. For example, the supervisor can be notified of a requested currency transfer, locking and unlocking of the piggy bank 104, questions asked to the animatronic animal 106, etc. In some embodiments, the supervisory abilities of the supervisor can decrease over time as the user becomes more independent. The user can be deemed as more independent by completing certain tasks, for example, the user completes certain financial health and money management lessons through the user client application 122, completes a predetermined number of successful currency transfers, etc.

In some embodiments, the parent can restrict access to particular features of the user client application 122 and have the ability to override commands from the second user device 102 to the piggy bank 104 and/or the animatronic animal 106. For example, the restrictions can include a restriction of the ability of the user to complete mobile wallet transactions above a determined value, complete mobile wallet transactions entirely, request currency transfers above a predetermined value, etc. In some embodiments, a parent can set-up the user client application 122 with restrictions that can only be removed by providing credentials (e.g., password, passcode, biometric data). Further restrictions, overriding abilities, and supervision is available as described in detail herein.

The user client application 122 may be downloaded by the user device 102 prior to its usage. The user client application 122 can hard coded into the memory 118 of the user device 102, or be a web-based interface application such that the user device 102 may provide a web browser to the application, which may be executed remotely from the user device 102. In the latter instance, the user may have to log onto or access the web-based interface before usage of the application. Further, and in this regard, the user client application 122 may be supported, at least partly, by a separate computing system including one or more servers, processors, network interface circuits, etc. that transmit certain features and functionalities to the user device 102. In certain embodiments, the user client application 122 includes an application programming interface (API) and/or a software development kit (SDK) that facilitate the integration of other applications with the user client application 122. In the example shown, the user client application 122 is downloaded to the user device 102, stored by the memory 118, and executed by the processor 120.

The user client application 122 is structured to generate graphical user interfaces depicting fields that enable the user to provide log-in credentials, and further gain access to the user client application 122. The fields can be free fields, single line text fields, etc. The log-in credentials can include a username and password, a payment account number and personal identification number (PIN), biometric scan (e.g., face identification, finger print identification), particular gestures/movements etc. In one embodiment, a field is provided on a graphical user interface generated by the user client application 122 for receiving a log-in credential. The user client application 122 is further structured to cross-reference the received log-in credentials with log-in credentials stored in memory 118. For example, multiple users (e.g., parent, child) may have accounts with the user client application 122. The accounts can also have tiered authorization levels. For example, a parent can provide log-in credentials that represent an authorization level greater than their child. Credentials for each user are stored in the memory 118. Upon receiving credentials, the user client application 122 cross-references or searches the stored credentials for a match. Based on a match of received and stored credentials, that user is successfully authenticated into the user client application 122. The user client application 122 can determine an unsuccessful log-in by an inability to identify and match the received log-in credentials with stored log-in credentials. The user client application 122 is structured to associate a financial account of the user with the piggy bank 104. Based on this association, the piggy bank 104 can be used to complete currency transfers amongst many other functionalities as described herein.

The user client application 122 can receive alerts from the piggy bank 104, animatronic animal 106, and/or provider computing system 110. The user client application 122 can use the received alerts to generate notifications to be presented, by the user device 102, to the user. For example, the user client application 122 can notify the user of successful/non-successful currency transfers, a successful/non-successful authentication to the piggy bank 104, if the piggy bank 104 and/or the animatronic animal 106 are taken out of a geofenced area, etc. The notifications can come in the form of a push notification, an email, a text message, etc. In one example, the user can be notified by the user client application 122 that the piggy bank 104 and/or the animatronic animal 106 were taken out of a geofenced area. In this instance, the user client application 122 can ping the location of the piggy bank 104 and/or the animatronic animal 106 that can be presented to the user overlaid on a map. In some embodiments the user client application 122 can reference the location of the piggy bank 104 and/or the animatronic animal 106 as well as the user device 102 to provide directions by the user device 102 to the user.

The user client application 122 is structured to allow the user to generate a geofenced area in which the user client application 122 is notified when the piggy bank 104 and/or the animatronic animal 106 are taken outside of. For example, the user client application 122 can display a map of the current location of the user device 102, wherein the user can define, by a user interface, a geofenced area. The current user location can be determined by utilizing a global positioning system (GPS). The user can also enter an address in which the geofenced area should surround.

In some embodiments, the user client application 122 can provide interactive lessons to teach the user a plurality of money management and financial health lessons. The user client application 122 can be communicably coupled with the piggy bank 104 and/or the animatronic animal 106 to provide lessons that incorporate the user of the piggy bank 104 and/or the animatronic animal 106. For example, the animatronic animal 106 can read along with the user and answer questions the user has, as is described herein. It should be appreciated that this is a single example, and there are many other methods for providing lessons to the user via the user device 102 that interact with the piggy bank 104 and/or the animatronic animal 106.

The user client application 122 is structured to allow for AR interactions (e.g., artificial reality, augmented reality, mixed reality). In some embodiments, the AR interactions are with the piggy bank 104 and/or the animatronic animal 106. For example, the AR interactions can be a way to instruct the user how to use the piggy bank 104. In this example, the user can direct a camera of the user device towards the piggy bank 104 where an augmented reality can be produced walking the user through instructions on how to use the piggy bank 104. In another example, the AR interactions can be augmented or artificial interaction with the animatronic animal 106. The AR interaction with the animatronic animal 106 can be a way to interact with the animatronic animal 106 for realistic movements in, for example, money management and financial health lessons, as described herein. In one embodiment, the user can bring the animatronic animal 106 to a local bank branch, where the user client application 122 can provide via the user device 102 an AR tour of the branch. In some embodiments, the tour of the branch can include introductions to local branch staff. In some embodiments, the user can complete the tours without the animatronic animal. The AR tour of the branch can be a way to comfortably familiarize the user with entering a bank.

The user client application 122 is structured to allow the user to unlock the piggy bank 104. In some embodiments, once the user has provided their log-in credentials, via the user device 102, to gain authorized access to the user client application 122 the user can unlock the piggy bank 104. In some embodiments, the user client application 122 can require further authentication. For example, the user may be prompted via the user device 102 to supply a passcode, password, passphrase, biometric data, etc. In some embodiments, the piggy bank 104 can be in dual custody, meaning the piggy bank 104 can require dual authentication to open the piggy bank 104 (e.g., user and friend, user and parent). In these instances, the user client application 122 can receive a request to open the piggy bank 104 by a first user associated with a first user device. Upon receiving a request to open the piggy bank 104 by the first user, a notification can be sent to a second user associated with a second user device 102 prompting the second user to authorize the unlocking of the piggy bank 104. In another embodiment, the user client application 122 can store multiple log-in credentials associated with separate users. Based on the input of the multiple log-in credentials associated with separate users, the user client application 122 can instruct the piggy bank 104 to unlock. It should be appreciated that these are particular example of how to authorize the unlocking of a piggy bank 104 that requires dual authentication.

The user client application 122 is structured to display a virtual equivalent of the piggy bank 104 and/or the animatronic animal 106. The virtual equivalents of the piggy bank 104 and/or the animatronic animal 106 can provide similar functionalities to the physical versions, but in a virtual form. For example, a virtual piggy bank 104 can allow the user and/or supervisor (e.g., parent and child) to add virtual items (e.g., digital money, IOUs), as well as additional functionalities as described herein. A virtual animatronic animal 106 can allow the user to ask questions to and/or talk with the virtual animatronic animal 106, as well as additional functionalities described herein.

The user client application 122 is structured to prompt the encoding circuit 124 to encode encodable physical coins with a transaction request including a desired amount of currency based on an input by a user via the user device 102. For example, the user can input via the user device 102 a desired amount of currency to add to an encodable physical coin. Based on this input the user device 102 via the encoding circuit 124 can encode the encodable physical coin with information regarding a permitted currency transfer from a specified financial account associated with the user. In some embodiments, the user can encode a particular receiving financial account associated with a second user (e.g., child) that can be decoded by a piggy bank 104 or a user device 102 of the second user. In some embodiments, the user is prompted to specify which financial account the funds should be transferred from, if the user has multiple accounts. Additionally, the user may be required to be authenticated before encoding the encodable physical coin (e.g., PIN, biometric data, dual device authentication). The user client application 122 can send the authorization for a currency transfer to the provider computing system 110 as a way to authenticate the currency transfer request by the second user. The authorization can specify the currency amount. In some embodiments, the authorization can specify the second user, if provided by the user during the encoding process. In some embodiments, the user client application 122 can have a list of the currency transfers that have been encoded onto encodable physical coins but not yet transferred. In some embodiments, the user via the user client application 122 on the user device 102 can cancel the currency transfer encoded on an encodable physical coin such that when the transfer is requested by the piggy bank 104 or a separate user device 102, the transfer is declined.

The encoding circuit 124 is structured to encode and decode encodable physical coins. The encoding circuit 124 can include a near field communication (NFC) sensor to encode the encodable physical coins. In some embodiments, the encodable physical coins are NFC tags that can be encoded with a transaction request that can be decoded by a second user device 102 and/or a piggy bank 104. The encoded transaction request can prompt the second user device 102 and/or the piggy bank 104 to transmit a currency transfer request between a first user and a second user (e.g., parent and child) to the provider computing system 110 specifying the particular currency amount. The transaction request can include a first financial account number, a currency quantity, an authorization value (e.g., PIN), a second financial account number, date of encoding, etc.

The input/output circuit 126 is structured to receive communications from and provide communications to the user associated with the user device 102. In this regard, the input/output circuit 126 is structured to exchange data, communications, instructions, etc. with an input/output component of the user device 102. Accordingly, in one embodiment, the input/output circuit 126 includes an input/output device. In another embodiment, the input/output circuit 126 includes communication circuitry for facilitating the exchange of data, values, messages, and the like between an input/output device and the components of the user device 102. In yet another embodiment, the input/output circuit 126 includes machine-readable media for facilitating the exchange of information between an input/output device and the components of the user device 102. In still another embodiment, the input/output circuit 126 includes any combination of hardware components, communication circuitry, and machine-readable media.

In some embodiments, the input/output circuit 126 comprises suitable input/output ports and/or uses an interconnect bus (not shown) for interconnection with a local display (e.g., a touchscreen display) and/or keyboard/mouse devices, touch sensors, pressure sensors, buttons, (when applicable), or the like, serving as a local user interface for programming and/or data entry, retrieval, or manipulation purposes. That is, the input/output circuit 126 provides an interface for the user to interact with various applications (e.g., the user client application 122) stored on the user device 102.

Still referring to FIGS. 1A and 1B, the piggy bank 104 may include a network interface circuit 128, a processing circuit 130, a piggy bank client application 136, an encoding circuit 138, and an input/output circuit 140. The network interface circuit 128 and the processing circuit 130 may function substantially similar to and include the same or similar components as the network interface circuit 114 and the processing circuit 116 described above, with reference to the user device 102. Thus, it should be understood that the description of the network interface circuit 114 and the processing circuit 116 of the user device 102, provided above, may be similarly applied to the network interface circuit 128 and the processing circuit 130 of the piggy bank 104.

The network interface circuit 128 is similarly structured and used to establish connections with other computing systems (e.g., the provider computing system 110, the user device 102, animatronic animal 106) via the network 112. The network interface circuit 128 may further include any or all of the components discussed above, with reference to network interface circuit 114. Further, the network interface circuit 128 may also be structured and used to establish a connection between the user device 102 and the piggy bank 104. For example, in some instances, the network interface circuit 128 may be configured to provide communication between the lock box 108 and the piggy bank 104 via a Bluetooth, Wi-Fi, and/or a near-field communication (NFC) connection.

The processing circuit 130 similarly includes a processor 134 and a memory 132. The processor 134 and the memory 132 are substantially similar to the processor 120 and the memory 118 described above. As such, the piggy bank 104 is similarly configured to run a variety of application programs and store associated in a database of the memory 132. For example, the piggy bank 104 may be configured to run the piggy bank client application 136.

The piggy bank client application 136 is structured to associate the piggy bank 104 with a particular financial account of a user. In some embodiments the user may have multiple financial accounts associated with the piggy bank 104. A financial account of the user can be associated with the piggy bank 104 by pairing via Bluetooth, NFC, a network connection, etc. to a user device 102 where the user has provided log-in credentials, as described above. Once the piggy bank 104 has been associated with a financial account of a user, the user may be able to complete currency transfers, amongst other functions as described herein, without input from a user device 102.

The piggy bank client application 136 can be structured to require credentials from the user before allowing the user to interact with the piggy bank 104. The piggy bank 104 can prompt the user to provide credentials by a touch screen on the piggy bank 104, a verbal prompt by a speaker on the piggy bank 104, a notification to the user device 102 associated with the user, etc. In some embodiments, the piggy bank 104 can receive credentials from the animatronic animal 106 as described herein. In some embodiments, the piggy bank 104 can require the user to enter a password, passcode, a particular doodle, etc. on a touch screen on the piggy bank 104. In some embodiments, the piggy bank 104 can require the user to do a secret gesture or dance move that is recorded by a camera on the piggy bank 104. In some embodiments, the piggy bank 104 can require the user to state a particular phrase that is recorded by a microphone on the piggy bank 104. It should be appreciated that these are particular ways to authenticate a user, and many other methods for authenticating the user are possible.

The piggy bank client application 136 is structured to instruct a locking mechanism to lock and unlock a lock of the piggy bank 104 based on input from the user. For example, once the user has been authenticated, as described above, the user can provide an input to the piggy bank 104 requesting the lock be unlocked. In some embodiments, the piggy bank 104 can receive a request to lock or unlock the lock from the user client application 122 of the user device. In some embodiments, the piggy bank 104 can receive a verbal request from the user (e.g., "open sesame", "hey Jack, can you lock the chest?"). The verbal requests can be chosen from predefined locking and unlocking phrases. In some embodiments, the user can set custom locking and unlocking phrases through the piggy bank client application 136. In some embodiments, the piggy bank 104 can receive a request via a touch screen on the piggy bank 104. In some embodiments, the piggy bank client application 136 can receive signals from sensors within the piggy bank 104 preventing the lock from being locked. For example, the compartment of the piggy bank 104 can include weight and/or motion sensors. In this instance, if the weight and/or motion sensors sense movement within the compartment, the piggy bank client application 136 can inhibit the piggy bank 104 from locking. This can be used to prevent small animals from being locked within the piggy bank 104.

In some embodiments, the piggy bank 104 can be under dual custody, meaning the piggy bank 104 can require dual authentication to open the piggy bank 104 (e.g., user and friend, user and parent). In these instances, the piggy bank client application 136 can receive a request to open the piggy bank 104 by a first user associated with a first user device. Upon receiving a request to open the piggy bank 104 by the first user, the piggy bank 104, via the piggy bank client application 136, can send a notification to a second user associated with a second user device 102 prompting the second user to authorize the unlocking of the piggy bank 104. In another embodiment, the piggy bank client application 136 can store multiple log-in credentials associated with separate users. Based on the input of the multiple log-in credentials associated with separate users, the piggy bank client application can instruct the lock of the piggy bank 104 to unlock. It should be appreciated that these are particular example of how to authorize the unlocking of a piggy bank 104 that requires dual custody.

The piggy bank client application 136 is structured to receive financial account information from the provider computing system 110. For example, the piggy bank client application 136 may display via a touch screen on the piggy bank 104 the balance of the one or more financial accounts associated with the piggy bank 104. In some embodiments, the user can review the transaction histories of the one or more accounts via the piggy bank 104.

The piggy bank 104 is structured to communicate with the lock box 108, the communication can be a wired communication, Bluetooth communication, NFC communication, etc. The user can lock and unlock the lock box 108 as described herein with respect to the piggy bank 104. In some embodiments, the user can set a separate lock box authentication for the lockbox by the piggy bank client application 136 through the piggy bank 104. For example the separate authentication can be a passcode, password, passphrase, particular doodle, secret gesture, dance move, etc. The separate authentication can be saved on the lock box 108. Additional information such as the name of the user, phone number of the user, device ID of the user device 102 associated with the user, etc. can also be saved in the memory of the lock box 108.

The piggy bank client application 136 is structured to receive, from a lock box 108, a required lock box authentication as well as additional information such as the name of the user, phone number of the user, device ID of the user device 102 associated with the user, etc. In some embodiments, the user can provide hints to help the second user unlock the lock box 108 if the authentication is forgotten. For example, the hints can be recorded phrases by the user. The piggy bank client application 136 is also structured to prompt the user to provide the required lock box authentication. The prompt can be in the form a textual prompt on the touch screen of the piggy bank 104, a verbal prompt from the speaker in the piggy bank 104, etc.

The piggy bank client application 136 is further structured to analyze the provided lock box authentication. For textual inputs such as password, passcodes, etc. the piggy bank client application 136 can determine if it is an exact match. If the lock box authentication is a pass phrase, gesture, doodle, dance move, etc. the piggy bank client application 136 can determine if the provided lock box authentication is sufficiently similar (e.g., 50% accurate, 75% accurate). Based on the determination that the correct lock box authentication has been provided by the user, the piggy bank client application 136 can prompt the lock box 108 to unlock. In some embodiments, if an incorrect authentication is provided, the piggy bank 104 can provide hints to the user, as described above. The piggy bank client application 136 can further be structured to transmit a notification to the user device 102 associated with the additional information stored in the lock box 108 as described above.

The piggy bank client application 136 is structured to count bills and coins as they are inserted in a slot of the piggy bank 104. The piggy bank client application 136 is further structured to keep a count of all of the money that is in the piggy bank 104. To update the count when money is removed, the user can enter the amount taken out on the touch screen of the piggy bank 104.

The piggy bank client application 136 is structured to receive a transaction request from the encoding circuit 138. The transaction request can include a prompt to transmit a currency transfer request to the provider computing system 110. In some embodiments, the user associated with the piggy bank 104 can choose a particular account to transfer the currency to, if the user has multiple associated financial accounts. In these embodiments, the user may also be able to choose to split the currency amount into multiple accounts. The user can be presented these options via a graphical user interface generated by the piggy bank client application 136 and presented by a touch screen on the piggy bank 104. The currency transfer request can include a first financial account number, a currency amount, an authorization code, and a date of encoding as decoded from the encodable physical coin. The currency transfer request can also include the desired second financial account number(s) and a date of decoding.

In some embodiments, the piggy bank client application 136 can be structured to prompt the encoding circuit 138 to encode an encodable physical coin with transaction request indicating a desired amount of currency based on an input by a user via graphical user interface generated by the piggy bank client application 136 and provided by a touch screen on the piggy bank 104. For example, the user can input via the touch screen on the piggy bank 104 a transaction request including a desired amount of currency to add to an encodable physical coin. Based on this input, the piggy bank 104 via the encoding circuit 138 can encode the encodable physical coin with a transaction request including a permitted currency transfer from a specified financial account associated with the user. In some embodiments, the user can encode a particular receiving financial account associated with a second user (e.g., friend) that can be decoded by a piggy bank 104 or a user device 102 of the second user. In some embodiments, the user is prompted to specify which financial account the funds should be transferred from, if the user has multiple accounts. Additionally, the user may be required to be authenticated before encoding the encodable physical coin (e.g., PIN, biometric data, dual device authentication). In some embodiments a user device 102 associated with the parent of the user can be notified to authorize the encoding. The piggy bank client application 136 can send the authorization for a currency transfer to the provider computing system 110 as a way to authenticate the currency transfer request by the second user. The authorization can specify the currency amount. In some embodiments, the authorization can specify the second user, if provided by the user during the encoding process.

The piggy bank client application 136 is structured to receive a confirmation of a successful currency transfer from the provider computing system 110. Based on the received confirmation of a successful currency transfer from the provider computing system 110, the piggy bank client application 136 may send a notification to the user device indicating the successful currency transaction and provide transaction summary information (e.g., first financial account number, second financial account number, currency amount, date of transfer).

The encoding circuit 138 is structured to encode and decode encodable physical coins. The encoding circuit 138 can include a near field communication (NFC) sensor to encode and/or decode the encodable physical coins. The encoding circuit 138 can decode encodable physical coins and transmit the decoded transaction request to the piggy bank client application 136. The decoded transaction request can include a first financial account number, a currency amount, an authorization code, and a date of encoding.

The input/output circuit 140 is structured to receive communications from and provide communications to the user associated with the piggy bank 104. In this regard, the input/output circuit 140 is structured to exchange data, communications, instructions, etc. with an input/output component of the piggy bank 104. Accordingly, in one embodiment, the input/output circuit 140 includes an input/output device. In another embodiment, the input/output circuit 140 includes communication circuitry for facilitating the exchange of data, values, messages, and the like between an input/output device and the components of the piggy bank 104. In yet another embodiment, the input/output circuit 126 includes machine-readable media for facilitating the exchange of information between an input/output device and the components of the piggy bank 104. In still another embodiment, the input/output circuit 140 includes any combination of hardware components, communication circuitry, and machine-readable media. In some embodiments, the input/output circuit 140 is configured to communicate with an external third party device to facilitate an interaction between the external third party device and the piggy bank 104. For example, the input/output circuit 140 can be configured to establish a near-field communication (NFC) connection with an external third party toy that includes an NFC tag and a microcontroller (e.g., such that detection of the NFC tag of the external third party toy causes the piggy bank 104 to output a display or sound based on the detection of the external third party toy).

In some embodiments, the input/output circuit 140 comprises suitable input/output ports and/or uses an interconnect bus (not shown) for interconnection with a local display (e.g., a touchscreen display) and/or keyboard/mouse devices (when applicable), microphone/speakers, cameras, weight sensors, motion sensors, chemical sensors, temperature sensors, liquid sensors, olfactory sensors, or the like, serving as an input/output for sensor data input, programming and/or data entry, retrieval, or manipulation purposes. That is, the input/output circuit 140 provides an interface for the user to interact with various applications (e.g., the piggy bank client application 136) stored on the piggy bank 104.

Still referring to FIGS. 1A and 1B, the animatronic animal 106 may include a network interface 142, a processing circuit 144 and an input/output circuit 150. The network interface circuit 128 and the processing circuit 144 may function substantially similar to and include the same or similar components as the network interface circuit 114 and the processing circuit 116 described above, with reference to the user device 102. Thus, it should be understood that the description of the network interface circuit 114 and the processing circuit 116 of the user device 102, provided above, may be similarly applied to the network interface 142 and the processing circuit 144 of the animatronic animal 106.

The network interface 142 is similarly structured and used to establish connections with other computing systems (e.g., the provider computing system 110, the user device 102, piggy bank 104) via the network 112. The network interface 142 may further include any or all of the components discussed above, with reference to network interface circuit 114. Further, the network interface 142 may also be structured and used to establish a connection between the animatronic animal 106 and the piggy bank 104. For example, in some instances, the network interface 142 may be configured to provide communication between the animatronic animal 106 and the piggy bank 104 via a Bluetooth, Wi-Fi, and/or a near-field communication (NFC) connection.

The processing circuit 144 similarly includes a processor 148 and a memory 146. The processor 148 and the memory 146 are substantially similar to the processor 120 and the memory 118 described above. As such, the animatronic animal 106 is similarly configured to run a variety of application programs and store associated in a database of the memory 132. For example, the animatronic animal 106 may be configured to run the financial communication application 149.

In some embodiments, the verbal prompts by the piggy bank 104 as described herein can be communicated to the animatronic animal 106 to be output by the speaker in the animatronic animal 106. The animatronic animal 106 can include a mechanism that moves the head of the animatronic animal in unison with the speaker output to give the visualization of the animatronic animal 106 speaking.

The animatronic animal 106 is structured to determine the presence of a user. The presence of a user can be determined by sound received by a microphone in the animatronic animal 106 and/or movement detected by the camera of the animatronic animal 106.

The financial communication application 149 is structured to determine when the user has addressed the animatronic animal 106. For example, the user can verbally address the animatronic animal 106 by stating a predefined phrase (e.g., "Hey Jack"). In some embodiments, the user can physically address the animatronic animal 106 by performing a common movement (e.g., wave).

The financial communication application 149 is structured to record and analyze what the user states verbally. In the analysis, the financial communication application 149 is structured to convert the recorded verbal statement into text. In some embodiments the financial communication application 149 is structured to further analyze the text file and save particular portions in memory 146 for reference in a response and/or later conversations. For example, a user may state "Hey Jack, I have a crush on my classmate, Billy". In this example, the financial communication application 149 can save this reference for use in a later conversation. For example, the financial communication application 149 can prompt the animatronic animal 106 to state at a later date "How is Billy?"

The financial communication application 149 is structured to transmit portions or the entirety of converted and/or non-converted verbal statements to the provider computing system 110. Based on previously saved user information and/or user financial information, the financial communication application 149 can receive communication prompts and/or communication monologues from the provider computing system 110. Communication prompts can be used to initiate conversations, and direct the conversation towards a topic of interest of the user as determined by the provider computing system. Communication monologues can include a complete statement that is spoken by the animatronic animal 106 as directed by the provider computing system. The received communication prompts and/or communication monologues can include financial suggestions. For example, based on the user previously stating they wanted a new toy, the financial communication application 149 can receive a financial suggestion from the provider computing system 110. The financial suggestion can include "I see you receive an allowance of $5 per day, if you don't buy snacks for just 3 days you will have enough money to buy the new toy."

In some embodiments, the animatronic animal 106 can include one or more artificial intelligence (AI) circuits. The one or more AI circuits can be a speaker recognition AI circuit, a speech recognition AI circuit, and/or a conversational AI circuit. The speaker recognition AI circuit can be used to analyze the recorded verbal statements of the user to confirm the statement was received from the user associated with the piggy bank 104 and/or the animatronic animal 106. Based on previously recording conversations, the speaker recognition AI circuit can be structured to determine particular speech characteristics of the user. By determining if the recorded speech contains the stored characteristics of the user, the speaker recognition AI model can function to authenticate the user by their speech. The speech recognition circuit can be used to analyze the speech of the user and convert the recorded verbal statements of the user into text. The conversational AI circuit can be used to study conversations between the user and the animatronic animal 106 and direct responses by the animatronic animal 106 to properly respond to the user. The conversational AI can additionally store personal user information for later use in conversation. The conversational AI can further be used with the speaker AI to prevent the animatronic animal 106 from providing personal user information to a person other than the user. The AI circuits as described above are configured to incorporate AI models to study received verbal statements. The AI circuits can be trained using previously recorded conversations and/or pre-gathered conversation and speech training data (e.g., from a third-party conversational software company) to learn and identify speech and conversational cues. In some instances, the AI circuits may additionally or alternatively utilize pre-trained AI models obtained or accessed via an API or other communication method. Additionally, in some embodiments, the animatronic animal 106 can analyze the speech and/or physical characteristics of the user to determine if the user is properly engaged. For example, the animatronic animal 106 can determine if the user is losing interest or becoming distracted based on the verbal response of the user becoming short or disinterested, the user positioning their body away from the piggy bank system 100, etc. Based on the determined loss of interest by the user, the animatronic animal 106 can respond in a way to engage the user. For example, the animatronic animal 106 can discuss a particular interest of the user (e.g., soccer, cooking). This is beneficial as it increases the ability of neuro-diverse users to utilize the piggy bank system 100.

In some embodiments, the animatronic animal 106 can utilize a sign language AI circuit that can function to recognize if the user is using sign language, and determine what the user is saying. The animatronic animal 106 can further communicate with the piggy bank 104 to display visual responses for the user. In some embodiments, the visual display can display text, a displayed use of sign language, etc. This is beneficial as it allows users to interact and communicate with the piggy bank system 100 using sign language. In some embodiments, the animatronic animal 106 can also receive physical cues from the user (e.g., nod, headshake, thumbs up, thumbs down).

In some embodiments, the AI circuits, as described above, can include additional safeguards. For example, the animatronic animal 106 can detect if the conversation with the user may have been compromised by a hacker. This can be done by determining irregularities in the conversation with the user. In response to the determination of irregularities, the user can be prompted via the user device 102, the piggy bank 104, and/or the animatronic animal 106 that the user may be conversing with a hacker. Additionally, in some embodiments, a supervisor (e.g., parent) of the user can be notified via a user device 102.

The financial communication application 149 is structured to initiate conversations with the user through a speaker and a microphone in the animatronic animal 106. The initiation of a conversation can be based on the determination of the presence of the user, as described above. In some embodiments, the initiation of a conversation can be the directing of a conversation towards a particular topic. For example, the financial communication application 149 can direct the conversation with a user to a financial planning topic where the animatronic animal 106 can determine a goal of the user (e.g., a financial goal).

The financial communication application 149 is further structured to read along with the user and/or read to the user financial health lessons in conjunction with the user device 102 and/or the piggy bank 104. In some embodiments, the financial communication application 149 can answer general questions relating to the financial health lesson. The financial communication application 149 can have preset responses to common questions. For example, the financial communication application 149 may have a preset response to the question "what is the difference between a savings account and a checking account?" In some embodiments, the financial communication application 149 can be structured to search the internet and/or a provider institution website for more complex questions.

In some embodiments, the financial communication application 149 is structured to complete financial analysis of the user financial information. In further embodiments, the financial analysis can be done completely or partially by the provider computing system 110. The financial communication application 149 is structured to maintain and analyze financial account information of the user. The financial account information of the user can be maintained in a user financial database 178 of the provider computing system 110. The financial account information can include account information such as, for example, account number, account owner, account co-signer, account balance, etc. The financial information can also include financial transaction history information such as, for example, form of payment (e.g., payment card, mobile wallet), merchant name, merchant category, time of transaction, transaction value, etc. The analysis of the financial account information can include saving trends. For example, the financial communication application 149 can recognize trends in the amount of money the user saves per day, per day, per week, per month, etc. In one embodiment, the financial communication application 149 can determine that the user receives an allowance every day.

In some embodiments, the financial communication application 149 can analyze the transaction history of the user to determine spending trends. For example, the financial communication application 149 can determine that the user usually uses a payment card to complete a transaction at a vending machine every day. In another example, the financial communication application 149 can determine that the amount of money spent at vending machines has increased every week for the last three weeks.

The financial communication application 149 is further structured to receive goals (e.g., financial goals) of the user from the piggy bank 104 and/or the animatronic animal 106. In some embodiments the goal can be to purchase a particular item (e.g., new video game). Based on the item stated, the financial communication application 149 can be structured to determine an average market price to determine an amount of money that must be saved. In some embodiments, the goal can be an amount of money the user would like to save.

The financial communication application 149 is structured to generate a suggestion based on the goal of the user and the analysis of the financial account information. The financial communication application 149 can suggest a reduction in discretionary spending overall or in a particular area. For example, the financial communication application 149 can receive a goal to save $50 dollars from the user. The financial communication application 149 can determine an average inflow of money (e.g., allowance). The financial communication application 149 can further determine the spending habits of the user, for example, the amount of money spent in particular spending categories (e.g., food, sporting goods, games). The financial communication application 149 can then generate a financial suggestion based on the spending habits of the user that if the user decreases spending in a particular spending category, the user could save a certain amount of money per day, week, month, etc. The financial communication application 149 can transmit this financial suggestion to the user via the user device 102, piggy bank 104, and/or the animatronic animal 106. In some embodiments, the financial communication application 149 can transmit multiple different financial suggestions.

The financial communication application 149 is further structured to determine an amount of time it will take to reach the goal if the user follows the suggestion(s), as described above. In some embodiments, the financial communication application 149 can also determine the amount of time it will take to reach the goal if the user does not follow the suggestion(s) and provide a comparison. This can be used as a lesson to inform the user about the power of saving. The financial communication application 149 is structured to transmit the determined amount of time and/or the comparison to the user device 102, piggy bank 104, and/or the animatronic animal 106.

The financial communication application 149 can receive an input of a chosen financial suggestion of the user from the user device 102, piggy bank 104, and/or the animatronic animal 106. Based on the chosen suggestion, the financial communication application 149 is structured to determine if the user has completed a purchase that does not align with the chosen financial suggestion. For example, if the user chose to follow a financial suggestion that suggest to stop spending money on snacks, the financial communication application 149 can analyze the financial transactions of the user and determine if the user has purchased snacks. When the user completes a purchase that does not align with the chosen financial suggestion, the financial communication application 149 can transmit a notification to the user device 102, piggy bank 104, and/or the animatronic animal 106. The notification can include a statement addressing the purchase and/or an updated amount of time needed to save the amount of money needed to reach the goal.

In some embodiments, the camera on the animatronic animal 106 can be used to complete mobile deposits of financial documents (e.g., checks). The animatronic animal 106 can prompt the user to hold the financial document in front of the animatronic animal 106. Once the picture has been taken, the image of the financial document can be transmitted to the provider computing system where the document can be processed. In some embodiments, the animatronic animal 106 can be used to complete transactions at a point of sale. For example, the animatronic animal 106 can be detached form the piggy bank system 100 and complete a transaction at a merchant using a near field communication transaction. Upon the transaction being completed, a notification can be sent to the user device 102. In some embodiments, the animatronic animal 106 can require the user device 102 to be within a set distance (e.g., 10 feet, 50 feet) of the animatronic animal 106 before the transaction can be completed. In some embodiments, the user can be authenticated by the animatronic animal 106 before completing the transaction. Additionally or alternatively, the animatronic animal 106 can request authentication from the user device 102 prior to completing the transaction.

In some embodiments, the user can bring the animatronic animal 106 to a local bank branch. Based on the location as determined by a GPS in the animatronic animal 106 and/or a recognition of the local bank branch by the camera of the animatronic animal 106, the animatronic animal 106 can guide the user on a tour through the bank branch. The tour can include introducing the user to bank employees. In some embodiments, the animatronic animal 106 can assist the user in a financial transaction (e.g., deposit, withdrawal). When the user has taken the animatronic animal 106 to a local bank branch, the user may unlock additional features. The additional features can include, for example, the animatronic animal 106 singing a song, the animatronic animal 106 doing a dance, etc. In some embodiments, the user can be given a reward by the provider institution, for example, a monetary reward, a percentage off a next purchase, another item to add to the piggy bank system 100, etc.

The input/output circuit 150 is structured to receive communications from and provide communications to the user associated with the animatronic animal 106. In this regard, the input/output circuit 150 is structured to exchange data, communications, instructions, etc. with an input/output component of the animatronic animal. The input/output circuit 150 can include, for example, a microphone, a speaker, motion sensors, pressure sensors, etc. In one embodiment, the input/output circuit includes sensors on the animatronic animal that can sense when the user touches or pets the animal. These sensors can be used to determine patterns in the contact. These patterns can be used by the animatronic animal 106 and/or the piggy bank 104 to authenticate the user. The input/output circuit 150 can further include a GPS sensor that can be used to alert the user device associated with the animatronic animal 106 and/or the piggy bank 104 if the animatronic animal 106 has been taken out of a geofenced area, as described above.

Still referring to FIGS. 1A and 1B, the piggy bank system 100 further includes a lock box 108. The lock box 108 can include a memory 152 and an input/output circuit 154. The memory 152 includes one or more memory devices (e.g., RAM, NVRAM, ROM, Flash Memory, hard disk storage) that store data and/or computer code for facilitating the various processes described herein. That is, in operation and use, the memory 118 stores at least portions of instructions and data for execution by the piggy bank 104 to control the functionality of a lock on the lock box 108. Moreover, the memory 152 may be or include tangible, non-transient volatile memory or non-volatile memory. The memory 152 can store the required authentication (e.g., passcode, hand gesture, body movement, spoken phrase) and hints as set by a first user to assist a second user in unlocking the lock box if an incorrect authentication is provided.

The input/output circuit 154 is structured to receive communications from and provide communications to the piggy bank 104. The input/output circuit 154 can also be referred to as input device 154. In this regard, the input/output circuit 154 is structured to exchange data, communications, instructions, etc. with an input/output component of the piggy bank 104. In some embodiments, the input/output circuit 154 comprises suitable input/output ports and/or uses an interconnect bus (not shown) for interconnection with the piggy bank 104. In some instances, the input/output circuit 154 may be configured to provide communication between the lock box 108 and the piggy bank 104 via a Bluetooth, Wi-Fi, and/or a near-field communication (NFC) connection. The input/output circuit 154 can include a connection to a mechanism to lock and unlock the lock box 108.

Still referring to FIGS. 1A and 1B, the piggy bank system 100 includes a provider computing system 110. The provider computing system 110 may be structured to receive and store user personal information and user financial information. The provider computing system 110 may be further structured to maintain user profiles and update user profiles based on information received from the user device 102, piggy bank 104, and/or animatronic animal 106. The provider computing system 110 can be structured to prompt conversations with the user through the animatronic animal 106. Additionally or alternatively, the provider computing system 110 can be structured to analyze user transaction history, and generate financial suggestions. The provider computing system 110 is a computing system owned, associated with, or otherwise operated by a provider (e.g., a financial institution) that provides and maintains one or more accounts (e.g., demand deposit account, credit or debit card account, brokerage account, mortgage account, etc.) on behalf of the user. In the example depicted, the provider institution is a financial institution. In some arrangements, the provider institution is also a mobile wallet provider configured to manage mobile wallet accounts on behalf of its customers (i.e., users), including authenticating mobile wallet transactions involving debits from the users' payment vehicles. For example, the provider institution may also operate the mobile wallet computing system in various embodiments.

The provider computing system 110 is structured as a backend computing system, such as a discrete server, a group of two or more computing devices/servers, a distributed computing network, a cloud computing network, and/or any other type of computing system capable of accessing and communicating using local and/or global networks (e.g., the network 112). The provider computing system 110 includes a network interface circuit 160, a processing circuit 162, and a user analysis circuit 170.

The network interface circuit 160 includes program logic that facilitates coupling of the provider computing system 110 to the network 112. The network interface circuit 160 can support communication between the user device 102 and the provider computing system 110, the piggy bank 104 and the provider computing system 110, and the animatronic animal 106 and the provider computing system 110. For example, the network interface circuit 160 can include a cellular modem, a Bluetooth transceiver, a radio-frequency identification (RFID) transceiver, and a near-field communication (NFC) transmitter. In some embodiments, the network interface circuit 160 includes the hardware and machine-readable media sufficient to support communication over multiple channels of data communication. Further, in some embodiments, the network interface circuit 160 includes cryptography capabilities to establish a secure or relatively secure communication session between the user device 102, piggy bank 104, animatronic animal 106 and the provider computing system 110. In this regard, information (e.g., personal interests, account information, personally identifiable information) may be encrypted and transmitted to prevent or substantially prevent a threat of hacking.

The processing circuit 162 includes a memory 164 coupled to a processor 134. As shown in FIG. 1A, the memory 164 is separate from the user profile database 176 and the user financial database 178. In other embodiments, the memory 164 may include the user profile database 176 and the user financial database 178. The user profile database 176 is configured to retrievably store user information. The user information can include age, gender, personal interests, goals, etc., as described herein. The user financial database 178 is configured to retrievably store user financial information such as, for example, financial account information (e.g., account number, account owner, account co-signer), account balances, financial transaction history, etc., as described herein.

The processor 166 may be implemented as one or more application-specific integrated circuits (ASICs), field-programmable gate arrays (FPGAs), a group of processing components, or other suitable electronic processing components. The memory 164 may be one or more devices (e.g., RAM, ROM, Flash memory, hard disk storage) for storing data and/or computer code for completing and/or facilitating the various processes described herein. The memory 164 may be or include non-transient volatile memory, non-volatile memory, and non-transitory computer storage media. The memory 164 may include database components, object code components, script components, or any other type of information structure for supporting the various activities and information structures described herein. The memory 164 may be communicably coupled to the processor 166 and include computer code or instructions for executing one or more processes described herein. In some embodiments, the provider computing system 110 is a distributed computing system and includes one or more servers. In this case, provider computing system 110 may include multiple network interface circuits 160 and/or multiple processing circuits 162.

The user analysis circuit 170 is structured to analyze information received from the user device 102, piggy bank 104, and/or animatronic animal 106. The user analysis circuit 170 is further structured to provide instructions and/or information regarding the user and/or financial accounts of the user to the user device 102, piggy bank 104, and/or the animatronic animal 106. For example, the user analysis circuit 170 can receive personal information (e.g., age, gender, interests) regarding the user from the user device 102 and provide the information at a later date as a communication prompt to the animatronic animal 106. The user analysis circuit 170 is further structured to complete financial requests (e.g., currency transfers, new account generation). For example, the provider computing system 110 can receive a request to transfer currency from a first account to a second account from the piggy bank 104. Based on this request, the user analysis circuit 170 can complete the transfer and notify the piggy bank 104 of the successful transfer of currency. The user analysis circuit can include an analysis circuit 172, a communication analysis AI circuit 174, a user profile database 176, and a user financial database 178.

The analysis circuit 172 is structured to maintain and analyze financial account information of the user. The financial account information of the user can be maintained in the user financial database 178. The financial account information can include account information such as, for example, account number, account owner, account co-signer, account balance, etc. The financial information can also include financial transaction history information such as, for example, form of payment (e.g., payment card, mobile wallet), merchant name, merchant category, time of transaction, transaction value, etc. The analysis of the financial account information can include saving trends. For example, the analysis circuit 172 can recognize trends in the amount of money the user saves per day, per day, per week, per month, etc. In one embodiment, the analysis circuit 172 can determine that the user receives an allowance every day.

In some embodiments, the analysis circuit 172 can analyze the transaction history of the user to determine spending trends. For example, the analysis circuit 172 can determine that the user usually uses a payment card to complete a transaction at a vending machine every day. In another example, the analysis circuit 172 can determine that the amount of money spent at vending machines has increased every week for the last three weeks.

The analysis circuit 172 is further structured to receive goals (e.g., financial goals) of the user from the piggy bank 104 and/or the animatronic animal 106. In some embodiments the goal can be to purchase a particular item (e.g., new video game). Based on the item stated, the analysis circuit 172 can be structured to determine an average market price to determine an amount of money that must be saved. In some embodiments, the goal can be to save a particular amount of money.

The analysis circuit 172 is structured to generate a financial suggestion based on the goal of the user and the analysis of the financial account information. The analysis circuit 172 can suggest a reduction in discretionary spending overall or in a particular area. For example, the analysis circuit 172 can receive a goal to save $50 dollars from the user. The analysis circuit 172 can determine an average inflow of money (e.g., allowance). The analysis circuit 172 can further determine the spending habits of the user, for example, the amount of money spent in particular spending categories (e.g., food, sporting goods, games). The analysis circuit 172 can then generate a financial suggestion based on the spending habits of the user that if the user decreases spending in a particular spending category, the user could save a certain amount of money per day, week, month, etc. The analysis circuit 172 can transmit this financial suggestion to the user via the user device 102, piggy bank 104, and/or the animatronic animal 106. In some embodiments, the analysis circuit 172 can transmit multiple different financial suggestions.

The analysis circuit 172 is further structured to determine an amount of time it will take to reach the goal if the user follows the suggestion(s) (e.g., financial suggestion(s)), as described above. In some embodiments, the analysis circuit 172 can also determine the amount of time it will take to reach the goal if the user does not follow the financial suggestion(s) and provide a comparison. This can be used as a lesson to inform the user about the power of saving. The analysis circuit 172 is structured to transmit the determined amount of time and/or the comparison to the user device 102, piggy bank 104, and/or the animatronic animal 106.

The analysis circuit 172 can receive an input of a chosen financial suggestion of the user from the user device 102, piggy bank 104, and/or the animatronic animal 106. Based on the chosen suggestion, the analysis circuit 172 is structured to determine if the user has completed a purchase that does not align with the chosen financial suggestion. For example, if the user chose to follow a financial suggestion that suggest to stop spending money on snacks, the analysis circuit 172 can analyze the financial transactions of the user and determine if the user has purchased snacks. When the user completes a purchase that does not align with the chosen financial suggestion, the analysis circuit 172 can transmit a notification to the user device 102, piggy bank 104, and/or the animatronic animal 106. The notification can include a statement addressing the purchase and/or an updated amount of time needed to save the amount of money needed to reach the goal.

The communication analysis AI circuit 174 is structured to analyze communications with the user via the user device 102, piggy bank 104, and/or the animatronic animal 106. The communication analysis AI circuit 174 is further structured to provide communication prompts and/or communication monologues to the user device 102, piggy bank 104, and/or the animatronic animal 106.

The communication analysis AI circuit 174 is structured to receive textual transcripts of the verbal statements of the user as well as recordings of the verbal statements of the user. The communication analysis AI circuit 174 can include a speaker recognition AI model. The speaker recognition AI model may be able to determine if the speaker is the user associated with the user device 102, piggy bank 104, and/or the animatronic animal 106. The speaker recognition AI model may be trained using previously recorded conversations. Based on the previously recording conversations, the speaker recognition AI model can be structured to determine particular speech characteristics of the user. By determining if the recorded speech contains the stored characteristics of the user, the speaker recognition AI model can function to authenticate the user by their speech. The communication analysis AI circuit 174 can further include a speech recognition AI model. The speech recognition AI model may be able to analyze the recorded verbal statements of the user and convert the recorded verbal statements into text. The speech recognition AI model can be trained using previously recorded verbal statements and/or pre-gathered speech training data (e.g., from a third-party speech software company) to learn and identify verbal cues. In some instances, the speech recognition AI model may additionally or alternatively utilize pre-trained AI models obtained or accessed via an API or other communication method. The communication analysis AI circuit 174 can further include a conversational AI model. The conversational AI model may be able to provide the user device 102, piggy bank 104, and/or animatronic animal 106 with conversational prompts and/or conversational monologues, as described above to allow the devices listed above to communicate with the user in a humanlike way. The conversational AI model can be trained using previously recorded conversations and/or pre-gathered conversation training data (e.g., from a third-party conversational software company) to learn and identify conversational cues. In some instances the conversational AI model may additionally or alternatively utilize pre-trained AI models obtained or accessed via an API or other communication method.

The communication analysis AI circuit 174 is structured to determine if verbal statement was spoken by the user associated with the user device 102, piggy bank 104, and/or the animatronic animal 106. The communication analysis AI circuit 174 can prompt the user upon set-up of the piggy bank system 100 to state a particular phrase to learn the voice of the user. In some embodiments, the communication analysis AI circuit 174 can continuously update the acceptable voice associated with the user. This can be beneficial as the user's voice may change over time. In some embodiments, the communication analysis AI circuit 174 can determine the emotion and/or sentiment of the user based on the particular tones and characteristics of the verbal response of the user.

The communication analysis AI circuit 174 is structured to analyze the recorded verbal statements form the user to determine interests and personal information and store the determined interests and personal information in the user profile database. Interests can include hobbies, favorite bands, etc. User personal information can include user age, user gender, family structure (e.g., nuclear), if the user has a crush on a classmate, the name of the user's best friend, etc. The interests and user personal information can be determined based on the conversations with the user and be used in later conversations with the user. In some embodiments, the communication analysis AI circuit 174 can determine that a person other than the user is speaking based on an analysis of the voice of the person. Based on the determination, the communication analysis AI circuit 174 can prevent the disclosure of user personal information.

In some embodiments, the communication AI circuit 174 can include additional safeguards. For example, the communication AI circuit 174 can detect if the conversation with the user may have been compromised by a hacker. This can be done by determining irregularities in the conversation with the user. In response to the determination of irregularities, the user can be prompted via the user device 102, the piggy bank 104, and/or the animatronic animal 106 that the user may be conversing with a hacker. Additionally, in some embodiments, a supervisor (e.g., parent) of the user can be notified via a user device 102.

The communication analysis AI circuit 174 is structured to provide the user device 102, piggy bank 104, and/or the animatronic animal 106 with communication prompts and/or communication monologues based on the received verbal statement from the user. For example a verbal prompt can be transmitted to the animatronic animal 106 initiating a conversation about tennis, a determined interest of the user. In another example, the communication analysis AI circuit 174 can transmit a communication monologue to the animatronic animal 106 in response the user discussing a class mate.

The communication analysis AI circuit 174 can be structured to prevent particular assumptions (e.g., gender) when the user discusses a particular person. For example the user may state "I have a crush on my classmate Kendall" to which the communication analysis AI circuit 174 may ask "Why do you like Kendall?" Upon the user contextually confirming the gender of a particular person (e.g., "He is nice") the communication analysis AI circuit 174 may refer to the particular person by gender specific pronouns. This is a particular example, and it should be appreciated that the prevention of assumptions can apply to many other areas of discussion.

The communication analysis AI circuit 174 is configured to discuss, via the user device 102, piggy bank 104, and/or the animatronic animal 106, banking information and/or goals with the user. In some embodiments, the communication analysis AI circuit 174 is structured to incorporate information about banking systems and/or financial health into conversations with the user. The communication analysis AI circuit 174 is further structured to answer questions the user has about the banking system or financial institutions by referencing prepopulated answers in the memory 164. In some embodiments, the communication analysis AI circuit 174 can discuss purchases made by the user by analyzing the transaction history of the user. For example, the communication analysis AI circuit 174 can transmit a communication monologue to the animatronic animal 106 after analyzing the transaction history of the user and seeing they completed a purchase at an arts and crafts store. The monologue can ask "are you planning to make some arts and crafts this weekend?"

Still referring to FIGS. 1A and 1B. In some embodiments additional items can be added to the piggy bank system 100. For example, a separate animal (e.g, pony) with an NFC tag and/or a microcontroller can be communicably coupled with the user device 102, piggy bank 104, and/or the animatronic animal 106. Upon communicably coupling the additional item to one of the devices of the piggy bank system 100, additional interactive features can become available. For example, an added animal in the piggy bank system 100 can be configured to converse with the animatronic animal 106.

Figure 2:
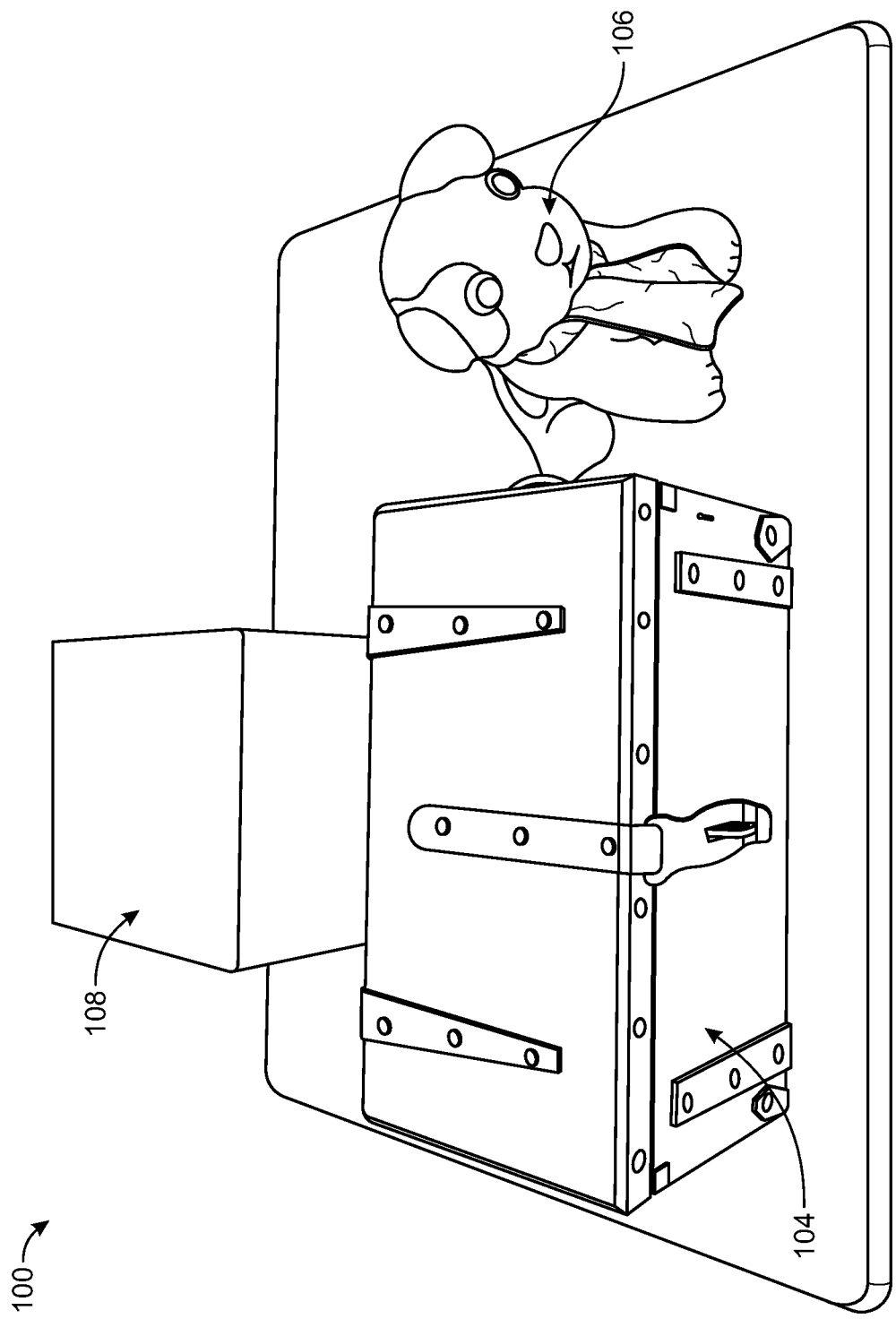
FIG. 2 is an illustration of the piggy bank system of FIG. 1, according to an example embodiment.

Referring now to FIG. 2, among others, an illustration of the piggy bank system 100 is shown according to an example embodiment. The piggy bank system 100, in some embodiments, comprises a piggy bank 104, an animatronic animal 106, and a lock box 108. In some embodiments, all of the components of the piggy bank system 100 can be placed on a platform, as shown in FIG. 2. The platform may be able to be plugged into a power outlet to continuously charge the piggy bank 104, animatronic animal 106, and/or the lock box 108. In some embodiments, the platform can include photovoltaic solar panels used to charge the components of the piggy bank system 100. In some embodiments, the piggy bank 104, animatronic animal 106, and/or the lock box 108 can be fixed to the platform. In some embodiments, the components of the piggy bank system can be charged wirelessly. In some embodiments, the components of the piggy bank system 100 can be removeably connected to the platform. The removeable connections can include docks that allow the platform to charge the components and further allow for wired communication between the components. The docks and/or simple wired connections can include power connections, lightning connections, USB connections, micro-USB connections, custom connections, etc. In further embodiments, the platform can be omitted from the piggy bank system. In these instances, the individual components can be charged individually and/or run on removable batteries.

In some embodiments, the piggy bank system 100 can include a carrying case or carrying bag as well as a chain or cable with a lock. The carrying case or carrying bag can be used by the user to transport the piggy bank 104, animatronic animal 106, and or the lock box 108. The chain or cable with a lock can be used to secure the piggy bank 104.

In some embodiments the piggy bank 104, animatronic animal 106, and or the lock box 108 can be oriented such that they are adjacent to one another. In some embodiments, the piggy bank 104 can include a dock and/or connection for the animatronic animal 106 on the lid of the piggy bank 104. These are particular arrangements, it should be appreciated that the components can be arrange in many other configurations and/or be stand-alone items that can be moved by the user.

The piggy bank system 100 can further comprise encodable physical coins. In some embodiments, the encodable physical coins can be of a similar shape and size of a silver dollar (26.5 mm diameter and 2 mm thickness). In some embodiments, the shape and size of the encodable physical coins can be approximately equal to a nickel (21.21 mm diameter and 1.95 mm thickness). In some embodiments, the encodable physical coin can have a diameter larger or smaller than those listed and a thickness larger or smaller than those listed. In some embodiments, the encodable physical coins can be of a different cross-sectional shape (e.g., hexagonal, octagonal). The encodable physical coins can include NFC tags (e.g., type 1, type 2, type 3, type 4, type 5). In some embodiments, the encodable physical coins include microprocessors. In these embodiments, the encodable physical coins can further include lights and/or speakers that can emit lights and/or sounds when the encodable physical coin is encoded and/or decoded.

The animatronic animal 106 can represent many different animals (e.g., dog, cat, horse, pig). In some embodiments, the animatronic animal 106 is a stuffed animal. For example, the animatronic animal 106 can have a fabric casing filled with stuffing. The fabric casing can have a texture similar to animal fur or skin. In some embodiments, the fabric casing can be plain cloth, plush, terry cloth, etc. The fabric casing can include a zipper to access the internal components as described herein. Additionally or alternatively, the fabric casing can include holes for additional components (e.g., camera, microphone, screen, speaker). The stuffing can include any suitable stuffing material (e.g., synthetic fiber, batting, cotton, plastic pellets).

In some embodiments, the animatronic animal 106 is a molded animal. In some embodiments, the molded animal can include moveable appendages (e.g., head, legs, tail). The molded animal can be molded from any suitable material (e.g., polyethylene (LDPE, HDPE), polypropylene (PP), polyvinylchloride (PVC)). The animatronic animal can include a compartment on the underside of the animal that can have a snap fit and/or a fastened lid that can contain batteries and other components as described herein. The molded animal can be molded such that the additional components (e.g., speaker, microphone, camera, screen) can be fit into and/or through the molded animal.

The animatronic animal 106 can include a microphone, speaker, camera, and/or screen. In some embodiments, the microphone, speaker, camera, and/or screen can be accessible to the user on the outside of the animatronic animal 106. In some embodiments, the microphone and speaker can be maintained within the animatronic animal 106. In some embodiments, the animatronic animal 106 can include a mechanism to move the head or mouth of the animatronic animal 106 to mimic speaking. The mechanism can include any suitable electromotive device (e.g., direct current motor, solenoid actuator).

The lock box 108 can include a compartment, a lid, a locking mechanism, and a lock. The lock box can be a cube, a rectangular prism, a cylinder, etc. The compartment can be made of any suitable material (e.g., aluminum, HDPE, PVC, PP). The compartment can function to store items such as, for example, letters, toys, candy, etc. The lock box 108 can be fortified such that it is sufficiently secure to be used as an at-home safe deposit box. The lid can be made of the same material or different material than the compartment. The lid can be connected to the compartment by a hinge. In some embodiments, the lid is completely removable from the lock box. The lid can be locked to the compartment by a lock fixed to the compartment. In some embodiments the lock includes a hooked end that is configured to grip a correspondingly hooked end or protrusion on the inside surface of the lid. In some embodiments, the lock can protrude between overlapping sections of the lid and compartment. It should be appreciated that these are example configurations, and many other methods of locking the lid to the compartment are possible. The locking mechanism can be connected to the input/output circuit 154 as described above. The locking mechanism can lock and unlock the lock depending on the signal received from the piggy bank 104. In some embodiments, the locking mechanism can be locked or unlocked by a physical key in the case of a forgotten authentication and/or electronic issues.

Figure 3:
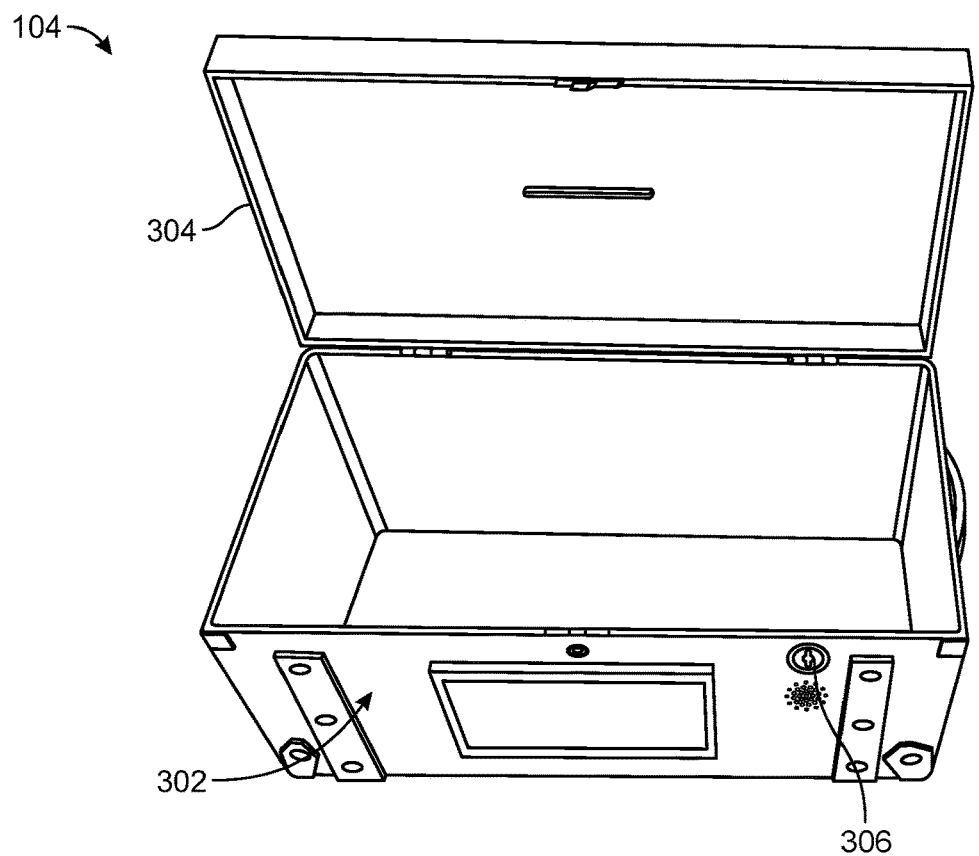
FIG. 3 is an illustration of the piggy bank of FIG. 1, according to an example embodiment.

Referring now to FIG. 3, among others, an illustration of the piggy bank 104 is shown, according to an example embodiment. In some embodiments, the piggy bank 104 can be structured to embody a treasure chest, as shown. The piggy bank 104 can include a compartment 302, a lid 304, and a locking mechanism 306. The lid 304 can be connected to the compartment 302 by a hinge, as shown in FIG. 3. In some embodiments, the piggy bank 104 can include an opening mechanism to open and close the lid 304. The opening mechanism can be attached to the inside of the compartment 302 and user a lever arm fixed to the lid 304 to open and close the lid 304. The opening mechanism can include any suitable mechanism. For example, the opening mechanism may be a servo, stepper motor, DC motor, solenoid actuator, etc. In some embodiments, the lid 304 can be completely removable from the compartment 302.

The locking mechanism 306 can function to lock and unlock a lock. The lock can function to fix the lid 304 to the compartment 302. The lock can fix a latch, fixed to the lid 304, to the compartment 302, as shown in FIG. 2. In some embodiments, the lock can be maintained within the compartment 302. In some embodiments the lock includes a hooked end that is configured to grip a correspondingly hooked end or protrusion on the inside surface of the lid 304. In some embodiments, the lock can protrude between overlapping sections of the lid 304 and compartment 302. In some embodiments, the lock can be an electromagnetic lock. It should be appreciated that these are example configurations, and many other methods of locking the lid 304 to the compartment 302 are possible.

The locking mechanism 306 can include any mechanism that can engage (lock) and disengage (unlock) the lock, as described above. For example, the locking mechanism 306 can be a servo motor, solenoid actuator, stepper motor, etc. In the instance where the lock is an electromagnetic lock, the locking mechanism 306 can be an electric current or lack of electric current. The locking mechanism 306 can be engaged and disengaged as instructed by the piggy bank 104, as described above. In some embodiments, the locking mechanism 306 can also be a keyed locking mechanism. The keyed locking mechanism can function to engage and disengage the lock as described above. This can be beneficial in the case of forgotten authentication and/or electronic issues.

Figure 4:
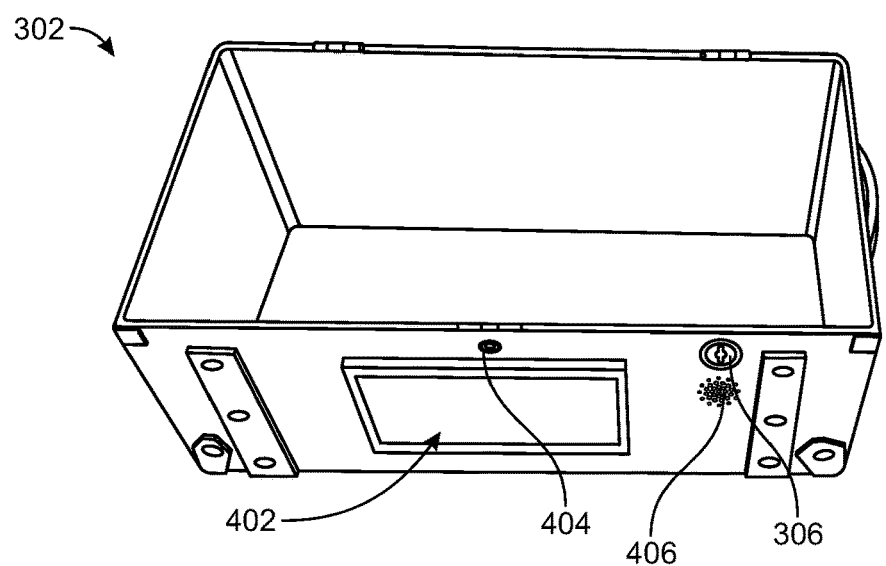
FIG. 4 is an illustration of the compartment of the piggy bank of FIG. 3, according to an example embodiment.

Referring to FIG. 4, among others, an illustration of a compartment 302 is shown according to an example embodiment. The compartment can comprise the locking mechanism 306, a touch screen 402, a camera 404, and a speaker 406. The compartment can further comprise a microphone, weight sensors, motion sensors, chemical sensors, temperature sensors, liquid sensors, olfactory sensors, and/or a GPS location device. The touch screen 402 can be located on a front surface of the compartment 302. The touch screen 402 can function to present the user with pictures, videos, and/or graphical user interfaces. The touch screen 402 can further function to receive input from the user based on the presented graphical user interfaces. In some embodiments, the touch screen 402 is located on the lid 304. In some embodiments, the compartment can further include touch/pressure sensors and/or buttons.

The camera 404 can be configured to collect images and/or video. In some embodiments, the camera 404 can be located in the center of the compartment 302, as shown in FIG. 4. In some embodiments, the camera 404 can be disposed to the left or right of the center of the compartment 302. In some embodiments, the camera 404 can comprise a light source configured to enable images and/or videos to be taken in a dark or dimly light surrounding. The speaker 406 can be configured to provide verbal prompts to the user. The speaker 406 can be located on the front surface of the compartment 302, as shown in FIG. 4. In some embodiments, the speaker 406 can be located on the sides, bottom, or back of the compartment 302. As described above, a microphone can be used to record verbal statements from the user. The microphone can be located on an exterior surface of the compartment 302. In some embodiments, a camera 404 can be located within the compartment 302 to allow the user to view items within the compartment. In some embodiments, the user can view videos or images of the inside of the compartment 302 in real time via the user device 102. In some embodiment, the inside of the compartment 302 can also include a light that allows the user to see inside of the compartment 302 when closed, or in a dimly light surroundings.

The compartment 302 can further include weight sensors on the bottom surface of the inside of the compartment. The weight sensors can record weights of the contents within the compartment 302. The weight sensors can also record fluctuations in weights within the compartment 302. The fluctuations in weights can indicate an animal is inside of the piggy bank 104 preventing the locking mechanism 306 from engaging the lock. The compartment 302 can further include motion sensors. The motion sensors can be located inside the compartment 302 and/or outside the compartment 302. The motion sensors inside the can function to indicate any movement inside the compartment. If movement is detected inside the compartment 302, the piggy bank 104 can prevent the locking mechanism 306 from engaging the lock. The motion sensors located on an external surface of the compartment 302 can function to indicate if a user is present. Based on a user being detected, the piggy bank 104 can inform the animatronic animal 106 and/or turn on the touch screen 402.

The compartment 302 can further include a chemical sensors. The chemical sensor can be located within the compartment 302. In some embodiments, the chemical sensor can be structured to sense if any harmful or explosive chemicals are located within the compartment 302. In some embodiments, the chemical sensor can be structured to sense if any illicit drugs (e.g., marijuana) are being stored within the compartment 302. Additionally or alternatively, the compartment 302 can include temperature sensors, liquid sensors, and/or olfactory sensors to detect if food/drinks, burning items, illicit items, etc. are within the compartment. The compartment 302 can further include a GPS location device. The GPS location device can function to determine the location of the piggy bank 104.

Figure 5:
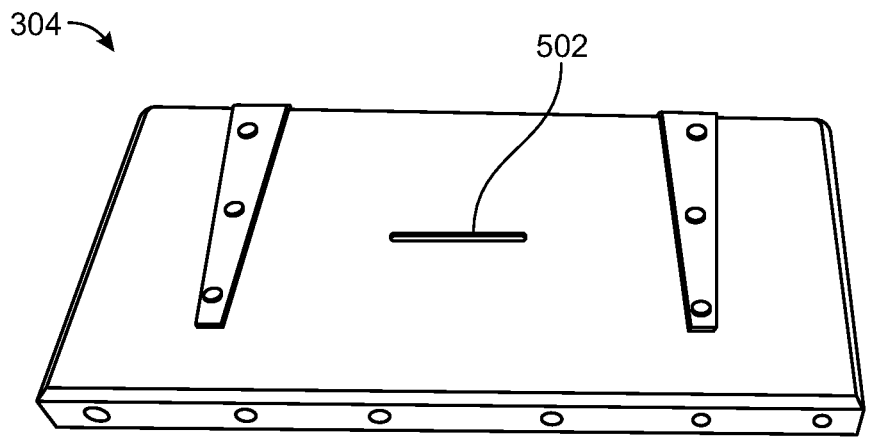
FIG. 5 is an illustration of a lid of the piggy bank of FIG. 3, according to an example embodiment.

Referring to FIG. 5, among others, an illustration of the lid 304 is shown according to an example embodiment. The lid 304 can comprise a currency slot 502. The lid 304 can be connected to the compartment 302 by a hinge. In some embodiments, the lid 304 can be connected to an opening mechanism, as described above, which can function to open and close the lid. In some embodiments, the lid 304 can include a latch, as shown in FIG. 3 that can function with a lock to lock the lid 304 to the compartment 302. In some embodiments, the lid can include an internal hook or protrusion that can be used to engage with a lock in the compartment 302. In some embodiments, the lid 304 can have photovoltaic solar panels fixed to the upper surface to charge the piggy bank 104. It should be appreciated that these are example configurations and there are many other possible configurations which could function to lock the lid 304 to the compartment 302.

The currency slot 502 is structured to allow the user to insert currency (e.g., bills, coins) into the piggy bank 104. The currency slot 502 is further configured to identify the currency as it is inserted. The currency slot 502 can include a magnetic reader to read the magnetic signature of the bill to determine the denomination of the bill inserted. The currency slot 502 can also include a plurality of sensors to determine the denomination of inserted coins. The plurality of sensor can include infrared emitters and receivers disposed on opposite walls of the currency slot 502. In some embodiments, the currency slot 502 can include a camera and/or scanner to visually determine the denomination of the currency inserted. The denomination of the coins can then be determined based on the size of the coin inserted. In some embodiments, the lid 304 has a separate coin slot that can use a series of differently sized opening into which coins of a particular denomination can fit and then be counted. In another embodiment the coin slot can determine the diameter of the coin by a mechanical arm that is deflected depending on the denomination of coin. These are particular configurations and it should be appreciated that there are many other possibly methods for determining the denomination of coins and/or bills.

The currency slot 502 can further include an NFC sensor, as described above. The NFC sensor can be used to decode the encodable physical coins inserted into the currency slot. In some embodiments, the currency slot 502 can be used to encode encodable physical coins using the same NFC sensor. In further embodiments, the lid 304 can include a separate location where the encodable physical coin can be placed near an NFC sensor such that the encodable physical coin can be decoded and/or encoded.

Figure 6:
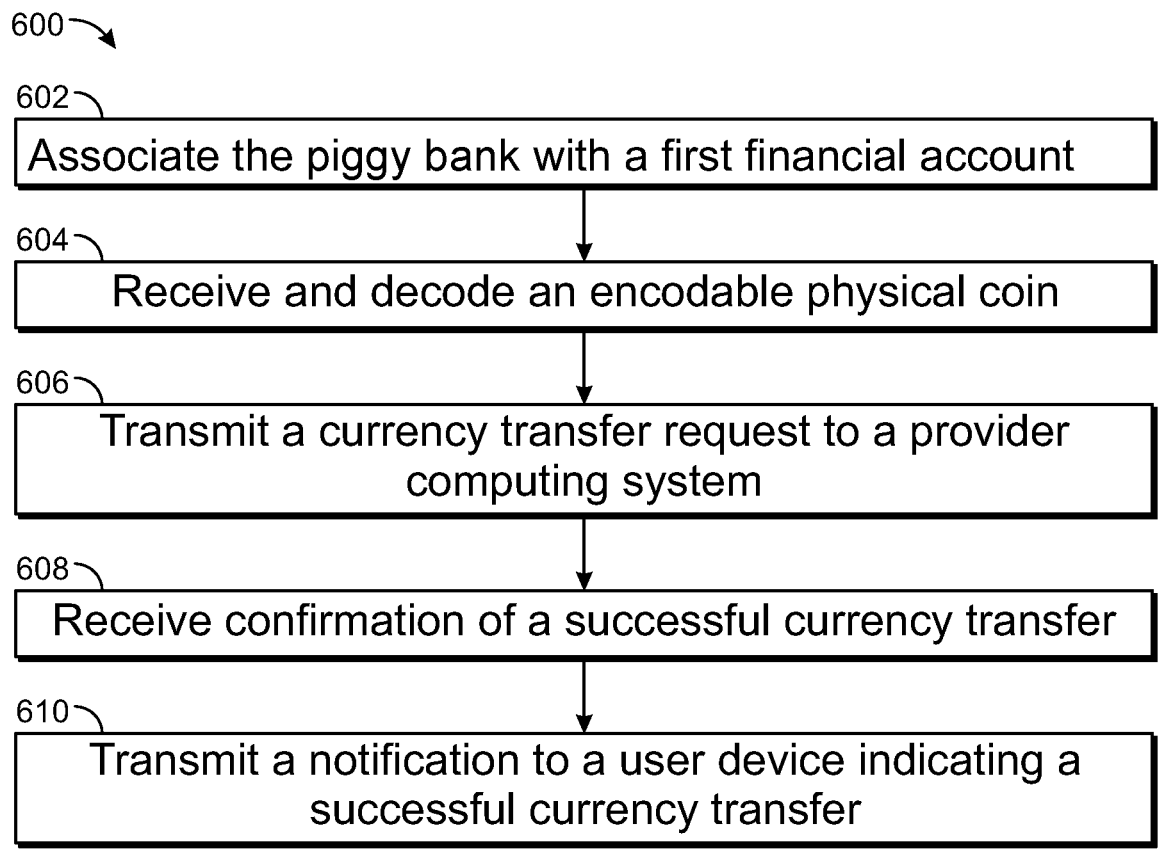
FIG. 6 is a flow diagram of a method of performing a currency transfer, according to an example embodiment.

Referring now to FIG. 6, among others, a flow diagram of a method of performing a currency transfer is shown, according to an example embodiment. The method may be performed by the components of FIGS. 1A and/or 1B, such that reference is made to one or more components of FIGS. 1A and/or 1B to aid in the explanation of the method 600. The method 600 is initiated by the piggy bank 104 being associated with one or more financial accounts of a first user at step 602. The piggy bank 104 can be associated with one or more financial accounts of the first user by providing financial account log-in credentials to the piggy bank 104. In some embodiments, the user can provide log-in credentials through the user device 102 to associate the user device 102 with one or more financial accounts of the first user. The user device 102 can then be connected (e.g., via Bluetooth, via NFC) to the piggy bank 104. By the connection of the user device 102 that is associated with one or more financial accounts of the first user, the piggy bank 104 can then be associated with the one or more financial accounts and perform actions (e.g., financial deposits, account balance checks). In some embodiments, the first user must provide a form of authentication (e.g., enter PIN) to the piggy bank 104 before actions can be taken by the piggy bank 104.

At step 604, the piggy bank 104 receives an encodable physical coin. The encodable physical coin can be previously encoded with a predetermined amount of currency from a second financial account using a user device 102 associated with the second user. The piggy bank 104 can then decode the encodable physical coin using an NFC sensor within the piggy bank 104. The piggy bank 104 can determine a transaction request including a financial account associated with the second user, a currency amount, a date of encoding, etc.

At step 606, the piggy bank 104 transmits a currency transfer request to the provider computing system 110. The currency transfer request can include the account number of the receiving account (first user financial account), the currency amount, and the number of the transmitting account (second user financial account), date of encoding, etc. In some embodiments, where the first user has associated multiple accounts with the piggy bank 104, the first user can select via a touch screen 402 on the piggy bank 104 which account to deposit the money into and/or a proportion of the currency amount to deposit in multiple accounts.

At step 608, the piggy bank 104 receives a confirmation of a successful currency transfer from the provider computing system 110. In some embodiments, the confirmation can include the time the currency was transferred, a second account number or the name of the account holder of the second account, the first account number/numbers, etc. In some embodiments, the piggy bank 104 can receive a response indicating a declined currency transfer. The response indicating a declined currency transfer can include a reason for decline (e.g., expired currency transfer request, transfer declined by the second user).

At step 610, the piggy bank 104 transmits a notification to the user device associated with the first user indicating a successful transfer of funds. The notification can include the time the currency was transferred, a second account number or the name of the account holder of the second account, the first account number/numbers, etc. The notification can be a push notification through the user client application 122 of the user device. In some embodiments, the notification is a text message notification and/or an email notification. In some embodiments, a notification can be sent to the user device 102 associated with the second user indicating a successful transfer of funds. The notification can include the time the currency was transferred, a first account number or the name of the account holder of the first account, the second account number/numbers, currency amount, etc.

Figure 7:
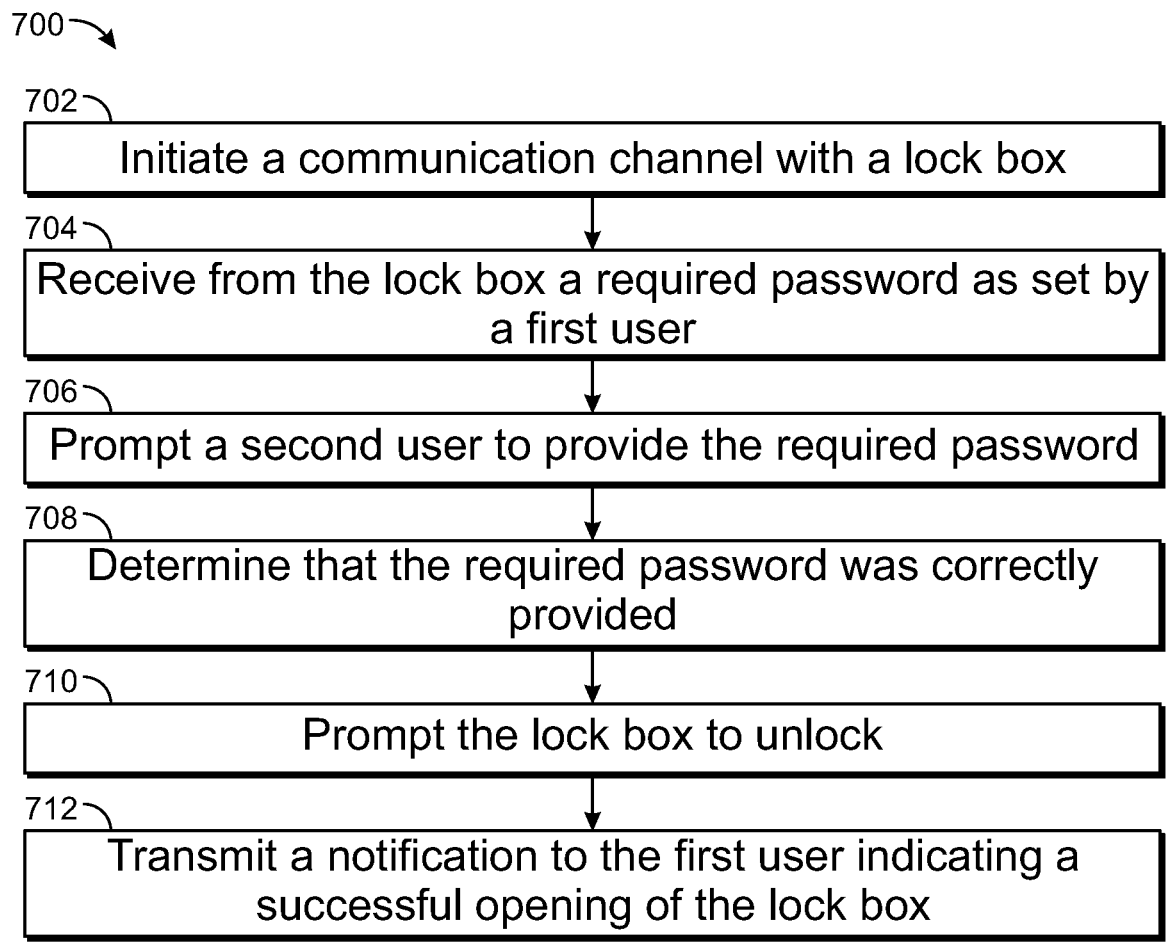
FIG. 7 is a flow diagram of a method of performing a physical possession transfer, according to an example embodiment.

Referring now to FIG. 7, among others, a flow diagram of a method of performing a physical possession transfer is shown, according to an example embodiment. The method may be performed by the components of FIGS. 1A and/or 1B, such that reference is made to one or more components of FIGS. 1A and/or 1B to aid in the explanation of the method 700. The method 700 can enable a first user to insert an item into a lock box 108 and lock it. The first user may then determine a necessary password to open the lock box 108, which is set by the piggy bank 104 of a first user and saved on the lock box 108. The first user may then give the locked lock box 108 to a second user to open using a second piggy bank 104 associated with the second user. The method 700 is initiated by the piggy bank 104 associated with the second user initiating a communication channel with a lock box 108 at step 702. In some embodiments, the piggy bank 104 is communicably coupled to the lock box 108 by a wired connection. In some embodiments, a wireless communication channel can be initiated by the piggy bank 104. The wireless communication channel can be any suitable connection (e.g., Bluetooth, NFC) that communicably couples the piggy bank 104 to the lock box 108 using a connection dependent protocol (e.g., Bluetooth protocol).

At step 704, the piggy bank 104 receives a required password as set by a first user from the lock box 108. The password can be any form of authentication that can be confirmed by the piggy bank 104. For example, the password can be a password, a passcode, a spoken phrase, a gesture, a dance move, a machine-readable code such as a QR code, etc. The piggy bank 104 can also receive information about the first user. For example, the piggy bank 104 can receive a device ID associated with the first user, a phone number of the first user, and/or an email of the first user. At step 706, the piggy bank 104 can prompt the second user to provide the required password. In some embodiments, the piggy bank 104 can provide the user with the necessary form of password entry. For example, if the password requires a textual input of alpha-numeric characters, the piggy bank 104 may provide an alpha numeric keyboard on the touch screen 402 of the piggy bank 104. In another example, if the password requires a particular gesture to be made, the piggy bank 104 can begin recording the user via the camera 404 and present a live video of the user via the touch screen 402. The piggy bank 104 can also use the camera to scan a QR code presented by the user. These are particular examples, and it should be appreciated that there are many further configurations to input a required password. In further embodiments, the piggy bank 104 may not provide the necessary form of password entry. In this instance, the piggy bank 104 may provide a list of possible forms of password entry via a generated graphical user interface on the touch screen 402.

At step 708, the piggy bank 104 determines that the required password was correctly provided. For textual inputs such as password, passcodes, etc. the piggy bank 104 can determine if it is an exact match. If the lock box authentication is a pass phrase, gesture, doodle, dance move, etc. the piggy bank 104 can determine if the provided lock box authentication is sufficiently similar (e.g., 50% accurate, 75% accurate). In some instances, if the required password was not correctly provided or not sufficiently similar, the piggy bank 104 can indicate that the provided password was incorrect and prompt the second user to try providing the password again. If the second user provides an incorrect password a predetermined amount of times (e.g., 3, 5, 10, 25) the piggy bank 104 can prohibit the user from attempting to unlock the lock box 108. In this instance, the lock box 108 can be opened by the first user utilizing the piggy bank 104 associated with the first user. For example, the second user can be prohibited from opening the lock box 108, but the second user can open the lock box by providing authentication via the piggy bank 104 associated with the first user and/or the piggy bank 104 associated with the second user.

At step 710, the piggy bank 104 prompts the lock box 108 to unlock based on the second user providing a correct password. The piggy bank 104 can transmit a signal to the lock box 108 that disengages the lock of the lock box 108. At step 712, the piggy bank 104 transmits a notification the first user indicating that the second user has successfully opened the lock box 108. In some embodiments, the notification can be a push notification through the user client application 122 of the user device 102 associated with the first user as determined by the device ID retrieved from the lock box 108. In some embodiments, the notification can be a text message and/or an email notification. The notification can include unlocking information such as, for example, the time the lock box was unlocked, the name of the second user, etc.

Figure 8:
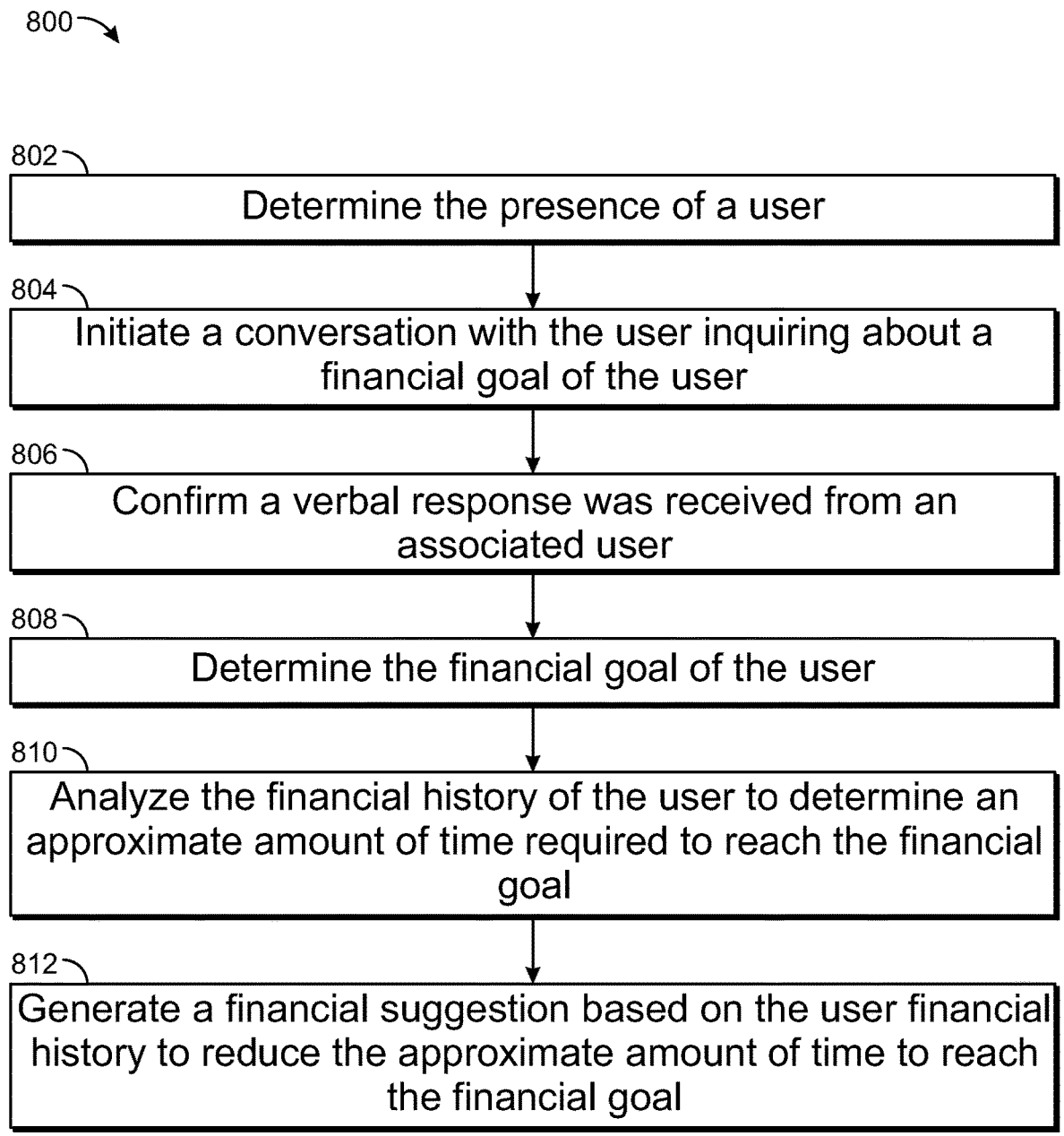
FIG. 8 is a flow diagram of a method of performing a financial lesson, according to an example embodiment.

Referring now to FIG. 8, among others, a flow diagram of a method of performing a financial lesson is shown, according to an example embodiment. The method may be performed by the components of FIGS. 1A and/or 1B, such that reference is made to one or more components of FIGS. 1A and/or 1B to aid explanation of the method 800. The method 800 can be initiated by the animatronic animal 106 determining and/or receiving information indicating the presence of a user. In some embodiments, the animatronic animal 106 can determine the presence of a user by the user saying a key phrase (e.g., "Hey Jack"). In some embodiments, the animatronic animal 106 can determine the presence of a user by a received signal from the piggy bank 104 indicating movement as sensed by a motion detector on the piggy bank 104. In some embodiments, the animatronic animal 106 can determine the presence of a user by comparing the location of the user device 102 to the location of the animatronic animal 106, and if within a predetermined amount of distance (e.g., 5 feet, 10 feet 20 feet), the animatronic animal 106 can determine the presence of the user. It should be appreciated that these are example embodiments, and there are many other methods to determine the presence of a user.

At step 804, the animatronic animal 106 can initiate a conversation with the user inquiring about a goal of the user. The conversation can include personal information saved by the provider computing system 110 and accessed by the animatronic animal 106 to converse with the user about topics of interest to them. Additionally, or alternatively, the animatronic animal 106 can access financial information of the user to discuss goals. In some embodiments, the animatronic animal 106 can receive communication prompts or communication monologues from the provider computing system 110.

In some embodiments, the animatronic animal 106 can inquire about a particular item the user would like to buy. For example, based on previous conversations with the user, the animatronic animal 106 can determine the user has a younger sister. In this instance, the animatronic animal 106 can inquire as to what the user plans to buy the younger sister for a particular occasion (e.g., Christmas, birthday, Hanukah). In some embodiments, the animatronic animal. In some embodiments, animatronic animal 106 can ask whether the user has thought about starting to save for a large purchase in the future (e.g., college, a car, a house).

At step 806, the animatronic animal 106 can confirm a verbal response was received from the user associated with the piggy bank 104 and/or animatronic animal 106. The animatronic animal 106 can record the verbal response by the user and compare it to a previously recorded verbal response of the confirmed associated user using a speaker recognition AI model to ensure the associated user is interacting with the animatronic animal 106.

At step 808, the animatronic animal 106 can determine a goal of the user. The goal can include a particular purchase the user would like to make (e.g., new toy, video game, birthday present), a set amount of money (e.g., $50, $100, $1000, $10000) the user would like to save by a set time (e.g., a week, a month, a year, 10 years), a reduction in the amount of money spent (e.g., per week, per month, per year), etc. The animatronic animal 106 can analyze the speech of the user using a speech recognition AI model to determine the goal of the user.

At step 810, the animatronic animal 106 can analyze the financial history of the user to determine an approximate amount of time required to reach the goal. In some embodiments, the animatronic animal 106 transmits the goal of the user to the provider computing system 110 where the provider computing system analyzes the financial history of the user to determine an approximate amount of time required to reach the goal. The animatronic animal 106 and/or the provider computing system 110 can analyze the financial history of the user including deposits and transactions to determine a saving trend of the user (e.g., $10/week, $50/month, ~$5/week). Based on the saving trend of the user and the determined goal, the animatronic animal 106 and/or the provider computing system can determine an approximate amount of time to reach the goal.

At step 812, the animatronic animal 106 and/or the provider computing system 110 can generate a financial suggestion based on the user financial history to reduce the approximate amount of time to reach the goal of the user. The financial transaction history can be analyzed to determine categories of discretionary spending that the user can reduce to save money. For example, if the transaction history of the user indicates that the user regularly buys items from vending machines, the financial suggestion can include reducing the amount of times the user buys snacks, or completely eliminate these purchases. In some embodiments the financial suggestion can include multiple suggestions.

Based on the generated financial suggestion, the animatronic animal 106 and/or the provider computing system 110 can determine an updated approximate amount of time needed to reach the goal of the user. In some embodiments, the animatronic animal 106 and/or the provider computing system 110 can compare the amount of time it will take the user to reach the goal if the user does or does not follow the suggestions. The suggested goal or goals can be presented to the user by the animatronic animal 106, the user device 102, and/or the piggy bank 104 along with the updated approximate amount of time to reach the financial goal (e.g., "you will reach your goal 3 weeks sooner if you follow the suggestions"). This can be used as a lesson to inform the user about the power of saving.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors is structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc). Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A piggy bank system comprising:
a piggy bank comprising:
   a compartment configured to receive contents;
   a lid coupled to the compartment and configured to contain the contents within the compartment when closed, the lid configured to open to allow access to the compartment;
   a sensor configured to sense when an encodable physical coin is added to or removed from the compartment, and configured to decode and encode the encodable physical coin;
   a network interface configured to facilitate data communication with a provider computing system and a user device via a network; and
   a processing circuit comprising a processor and a memory, the processing circuit configured to:
      associate the piggy bank with a first account associated with a user;
      receive, from the sensor, decoded coin data from the encodable physical coin added to the compartment, wherein the decoded coin data includes a transaction request indicating a currency amount to be transferred to the first account from a second account;

transmit the transaction request to the provider computing system;

receive a transaction request confirmation from the provider computing system; and transmit a notification to the user device of the user indicating the currency amount has been deposited into the first account associated with the user.

2. The system of claim 1, wherein the piggy bank further includes a touch screen configured to receive an input.

3. The system of claim 2, wherein the transaction request is a first transaction request, and wherein the processing circuit is further configured to:

receive the input via the touch screen, the input providing transaction information for a second transaction request, the transaction information indicating a second amount of currency;

encode the second transaction request onto the encodable physical coin; and transmit a notification to the user device indicating the second transaction request has been encoded onto the encodable physical coin.

4. The system of claim 1, the piggy bank further comprising:

an animatronic animal;
a microphone; and
a speaker.

5. The system of claim 4, wherein the processing circuit is further configured to:

initiate, via the speaker, a conversation with the user regarding a financial goal of the user;

receive, via the microphone, a verbal response from the user;

confirm, from the verbal response, that the verbal response was received from the user using a speaker recognition process;

determine, based on the verbal response, the financial goal of the user;

retrieve a financial history of the user;

determine an estimated amount of time that it will take the user to reach the financial goal based on the financial history of the user;

generate a suggestion for the user based on the financial history of the user to reduce the estimated amount of time that it will take the user to reach the financial goal; and provide the suggestion to the user via the speaker.

6. The system of claim 5, wherein the financial goal of the user is a savings goal for purchasing an item.

7. The system of claim 1, wherein the encodable physical coin is encoded by another user device associated with another user utilizing a provider client application.

8. The system of claim 1, the piggy bank further comprising a lock selectively actuatable between a locked position to prevent the lid from opening and an unlocked position to enable the lid to open, wherein the processing circuit is further configured to:

receive a verbal input from the user to adjust the lock to the unlocked position;

confirm the verbal input was received from the user using a speaker recognition process; and adjust the lock to the unlocked position based on the confirmation.

9. The system of claim 1, wherein the compartment includes a motion sensor and a weight sensor.

10. A method comprising:

associating, by a processing circuit of a piggy bank system, a piggy bank with a first account of a user, the piggy bank comprising: a compartment configured to receive contents, a lid coupled to the compartment and configured to contain the contents within the compartment when closed, a first sensor configured to sense when an encodable physical coin is added to or removed from the compartment, and a second sensor configured to sense at least one of weight or motion of the contents within the compartment, wherein the first sensor is a near field communication (NFC) sensor;

receiving, by the processing circuit, decoded coin data from the encodable physical coin added to the compartment of the piggy bank, wherein the decoded coin data includes a transaction request indicating a currency amount to be transferred to the first account from a second account;

detecting, by the processing circuit and the second sensor, a movement of the contents within the compartment;

preventing, by the processing circuit and based on the detected movement, the piggy bank from locking the contents within the compartment;

transmitting, by the processing circuit, the transaction request to a provider computing system;

receiving, by the processing circuit, a transaction request confirmation from the provider computing system; and transmitting, by the processing circuit, a notification to a user device of the user indicating the currency amount has been deposited into the first account of the user.

11. The method of claim 10, wherein the transaction request is a first transaction request, and the wherein the method further comprises:

receiving, via a touch screen of the piggy bank system, an input providing transaction information for a second transaction request, the transaction information indicating a second amount of currency;

encoding, by the processing circuit, the second transaction request onto the encodable physical coin; and transmitting, by the processing circuit, another notification to the user device indicating the second transaction request has been encoded onto the encodable physical coin.

12. The method of claim 10, further comprising:

initiating, via a speaker of the piggy bank system, a conversation with the user regarding a financial goal of the user;

receiving, via a microphone of the piggy bank system, a verbal response from the user;

confirming, by the processing circuit from the verbal response, that the verbal response was received from the user using a speaker recognition process;

determining, by the processing circuit based on the verbal response of the user, the financial goal of the user;

retrieving, by the processing circuit, a financial history of the user;

determining, by the processing circuit, an estimated amount of time it will take the user to reach the financial goal;

generating, by the processing circuit, a suggestion for the user based on the financial history of the user to reduce the estimated amount of time that it will take the user to reach the financial goal; and providing, via the speaker, the suggestion to the user.

\* \* \* \* \*